(12) United States Patent
Pan

(10) Patent No.: US 8,238,293 B2
(45) Date of Patent: Aug. 7, 2012

(54) METHOD OF EVALUATING CHANNEL BANDWIDTH UTILIZATION RATIO, WIRELESS COMMUNICATION SYSTEM, APPARATUS FOR EVALUATING CHANNEL BANDWIDTH UTILIZATION RATIO AND PROGRAM THEREOF

(75) Inventor: Huanxu Pan, Tokyo (JP)

(73) Assignee: NEC Corporation, Tokyo (JP)

( * ) Notice: Subject to any disclaimer, the term of this patent is extended or adjusted under 35 U.S.C. 154(b) by 426 days.

(21) Appl. No.: 11/514,906

(22) Filed: Sep. 5, 2006

(65) Prior Publication Data

US 2007/0054645 A1 Mar. 8, 2007

(30) Foreign Application Priority Data

Sep. 6, 2005 (JP) .................................. 2005-257457

(51) Int. Cl.
  *H04W 4/00* (2009.01)
(52) U.S. Cl. ....................... 370/329; 455/450; 455/452.1
(58) Field of Classification Search .................. 370/237, 370/329, 330, 230, 468, 313; 709/238–242; 455/452.2; 450/455
See application file for complete search history.

(56) References Cited

U.S. PATENT DOCUMENTS

| 6,016,311 | A * | 1/2000 | Gilbert et al. | 370/280 |
| 7,460,480 | B2 * | 12/2008 | Awais | 370/236 |
| 2006/0095943 | A1 * | 5/2006 | Demircin et al. | 725/81 |
| 2006/0120282 | A1 * | 6/2006 | Carlson et al. | 370/229 |

FOREIGN PATENT DOCUMENTS

| JP | 2005-086816 A | 3/2005 |
| JP | 2005-236388 A | 9/2005 |

OTHER PUBLICATIONS

Sachin Garg et al. "Can I Add a VoIP Call?" Proc. of IEEE ICC'03, vol. 2, pp. 779-783, 2003.
Huanxu Pan et al. "On the Throughput of an IEEE 802.11a Wireless LAN System with Terminals under Heterogeneous Radio Conditions", Proc. of the $18^{th}$ ITC, 2003.
Japanese Office Action corresponding to Application No. JP 2005-257457, dated Sep. 14, 2010.
Tamura, et al., "A study on QoS control in wireless LAN communication services", Technical Report of IEICE, NS2003-301,IN2003-256(Mar. 2004), vol. 103, No. 690, pp. 29-32 (with attachment: IEICE Cover page and Table of Contents).

* cited by examiner

*Primary Examiner* — Marcos Batista
(74) *Attorney, Agent, or Firm* — Sughrue Mion, PLLC

(57) ABSTRACT

An inputting unit 10 of a channel bandwidth utilization ratio evaluating server 1 inputs various traffic parameters and transmission parameters. A packet sending-out time computing section 21 obtains a packet sending-out channel time based upon a packet size and the transmission rate. Further, a probability computing section 22 obtains a channel bandwidth utilization ratio based upon the packet sending-out channel time, a cycle time of a packet, and a communication error ratio. Further, the channel bandwidth utilization ratio evaluating server 1 evaluates the obtained channel bandwidth utilization ratio. For example, the channel bandwidth utilization ratio evaluating server 1 determines whether or not receipt of a new call is permitted based upon the obtained channel bandwidth utilization ratio. Further, the channel bandwidth utilization ratio evaluating server 1 determines an optimum control based upon the obtained channel bandwidth utilization ratio.

20 Claims, 10 Drawing Sheets

METHOD OF EVALUATING CHANNEL BANDWIDTH UTILIZATION RATIO, WIRELESS COMMUNICATION SYSTEM, APPARATUS FOR EVALUATING CHANNEL BANDWIDTH UTILIZATION RATIO AND PROGRAM THEREOF

BACKGROUND OF THE INVENTION

The present invention relates to a channel bandwidth utilization ratio evaluation method of evaluating a channel bandwidth utilization ratio of each stream, a channel bandwidth utilization ratio evaluating apparatus, and a channel bandwidth utilization ratio evaluation program in a wireless communication system having a MAC (Medium Access Control) layer, which is accompanied by random access, like a VoWLAN (Voice over Wireless LAN). Further, the present invention relates to a wireless communication system employing the channel bandwidth utilization ratio evaluation method.

As the wireless LAN has prevailed, it has become possible to easily construct the wireless communication system for making various kinds of wireless-LAN-based stream communication. For example, it has become possible to simply construct a voice communication system (VoWLAN) for making communication of a wireless-LAN-based voice stream. However, considered from the nature of the VoWLAN, as a rule, the wireless bandwidth (a utilization ratio of the bandwidth) that the voice stream actually utilizes in the VoWLAN tends to vary greatly depending upon system conditions. For this reason, so as to efficiently administer a voice quality in the VoWLAN, it is of importance to grasp an effective use bandwidth of each voice stream and a voice performance of each voice stream.

As a system for evaluating the effective use bandwidth and the voice performance of each voice stream, for example, the system is described in non-patent document 1 of evaluating the maximum connectable voice call number in the wireless LAN using an IEEE802.11. Further, in non-patent document 2, an applicant has proposed the method of evaluating a performance of the wireless LAN having communication errors taken into consideration.

[Non-patent document 1] S. Garg, M. Kappes, "Can I add a VoIP call?" Proc. of IEEE ICC '03, vol. 2, pp. 779-783, 2003.

[Non-patent document 2] H. Pan, S. Sato, K. Kobayashi, "On the Throughput of an IEEE 802.11a Wireless LAN System with Terminals under Heterogeneous Radio Conditions", Proc. of the 18th ITC, 2003.

SUMMARY OF THE INVENTION

In a wireless voice communication system having the MAC layer, which is accompanied by the random access, like the wireless LAN, each terminal and an access point (AP) share a resource of the wireless channel while they autonomously compete with each other for traffics by each terminal and an access point. This causes the utilization bandwidth of the channel to be changed with all traffic streams within the system when various system conditions change in the wireless communication system that is accompanied by the random access. A change in the system conditions, for example, an increase/decrease in the number of the terminal, a change in the wireless condition caused by a certain terminal's travel, and a change in a transmission speed or a transmission error ratio gives rise to a change in the effective utilization bandwidth of all traffic streams as well due to these influences. Such a characteristic is different from that of a mobile communication system for administering a distribution of the channel resource with a means such as a time division.

Accordingly, in the wireless communication system, which is accompanied by the random access, it is not easy to draw a conclusion on an influence upon a system load and an influence upon a communication quality of each voice call, which are brought about by a change in the system condition (the terminal number, the terminal position, the transmission speed, and the transmission error rate) as mentioned above. Further, in a case where a new call has occurred, a conclusion as to whether or not receipt of the call that has occurred is permitted cannot be drawn easily because an influence upon the system load and the communication quality cannot be easily estimated.

For example, when a new voice call has occurred, if it can be grasped (estimated) how the channel bandwidth utilization ratio, the channel vacant-bandwidth ratio, and the communication quality of each voice stream in having received its new call change, it can be determined whether or not its new call should be admitted, based upon its estimation result. In the wireless communication system that is accompanied by the random access, it is not easy to draw a conclusion on propriety of the receipt of the new call because a change in the channel bandwidth utilization ratio, the channel vacant-bandwidth ratio, and the communication quality cannot be easily estimated.

In the evaluation system described in the non-patent document 1, the maximum connectable voice call number in the wireless LAN employing the IEEE802.11 can be evaluated. In the evaluation system described in the non-patent document 1, however, so as to simplify an evaluation model for evaluating the maximum connectable voice call number, the wireless transmission error of each terminal is neglected, and a collision probability of communication data is assumed to be three percent in a uniform manner. As a matter of fact, an influence of the wireless transmission error upon the effective use bandwidth cannot be neglected depending upon a distance between transmission and reception, and a situation of radio wave interference. Further, the collision probability changes also under an influence of the wireless transmission error ratio other than the traffic conditions. Further, in the evaluation system described in the non-patent document 1, there is no description of evaluating the channel bandwidth utilization ratio and the channel vacant-bandwidth ratio in having received the new call. Accordingly, it is impossible to evaluate the use bandwidth in the wireless communication system (for example, the VoWLAN system), which is accompanied by the general random access that occurs as a matter of fact, even though the evaluation system described in the non-patent document 1 is employed.

Further, in the non-patent document 2, with the method of evaluating a performance of the wireless LAN, the applicant has proposed an evaluation method of evaluating a throughput and a delay in a case that each terminal and the access point (AP) make transmission at any time, taking the wireless error into consideration. With the VoWLAN, however, a packet is transmitted according to a constant traffic pattern for each voice stream, differently from the case of making communication at any time. That is, with the VoWLAN, the comparatively lengthy stream-manner traffic is generated. For this reason, it is desirable that the evaluation method described in the non-patent document 2 is adapted so that it can be applied to the wireless communication system (for example, the VoWLAN) as well such that the stream-manner traffic is generated.

Thereupon, the present invention has an object of, in the system for making stream communication that is accompanied by the random access, providing a channel bandwidth utilization ratio evaluation method of precisely evaluating an influence of a change in the system conditions upon the channel bandwidth utilization ratio, a wireless communication system, a channel bandwidth utilization ratio evaluating apparatus, and a channel bandwidth utilization ratio evaluation program. Further, the present invention has an object of providing a channel bandwidth utilization ratio evaluation method of determining a call receipt control based upon an evaluation result of the channel bandwidth utilization ratio, thereby to control and administer the wireless resource, a wireless communication system, a channel bandwidth utilization ratio evaluating apparatus, and a channel bandwidth utilization ratio evaluation program.

The channel bandwidth utilization ratio evaluation method in accordance with the present invention, which is a channel bandwidth utilization ratio evaluation method of evaluating a utilization ratio of the channel bandwidth of the wireless communication system for making stream communication that is accompanied by the random access, is characterized in including the steps of: obtaining a channel bandwidth utilization ratio, being a utilization ratio at which data, being is an object of communication, utilizes the bandwidth of the channel of the wireless communication system, based upon a traffic parameter (for example, a packet size and a packet cycle time), being a parameter indicating the traffic condition in the wireless communication system, and a transmission parameter (for example, a transmission rate, and a communication error ratio), being a parameter indicating the transmission condition in which data, being is an object of communication, is transmitted; and evaluating the obtained channel bandwidth utilization ratio. Additionally, the so-called "evaluating a channel bandwidth utilization ratio", which is to perform various determination processes based upon the channel bandwidth utilization ratio, is, for example, to determine whether or not a call that has occurred newly should be admitted, based upon the channel bandwidth utilization ratio.

Further, the channel bandwidth utilization ratio evaluation method, which is a method of evaluating a use bandwidth ratio of each voice stream in the wireless voice communication system (for example, the VoWLAN) having a plurality of transmission terminals (for example, a wireless terminal 3) or the access point (AP) that use the identical wireless channel, desirably includes a step of inputting input information (for example, the traffic parameter and the transmission parameter) indicating the traffic condition and the transmission condition of each voice stream to calculate a channel time (for example, a packet sending-out channel time $s_i$) that is used for sending out the packet of each stream, to express a relation of a packet collision probability (for example, a collision probability $c_i$), a packet failure-in-transmission retransmission ratio (for example, a retransmission probability $f_i$), a channel use ratio (for example, a channel bandwidth utilization ratio $u_i$), and a channel vacant-bandwidth ratio (for example, a channel vacant-bandwidth ratio v) of each stream in an equation, to solve its equation, thereby to compute each provability (for example, the collision probability $c_i$, the retransmission probability $f_i$, the channel bandwidth utilization ratio $u_i$, and the channel vacant-bandwidth ratio v).

The wireless communication system in accordance with the present invention, which is a wireless communication system (for example, the VoWLAN) for employing a MAC (Medium Access Control) layer, thereby to make stream-type communication in a wireless environment accompanied by the data retransmission due to the wireless transmission error or a collision of data, which is accompanied by the random access, is characterized in including a utilization ratio evaluating means (which is, for example, realized by means of a probability computing section 22) for evaluating a channel bandwidth utilization ratio, being a utilization ratio at which each stream utilizes the bandwidth in the wireless channel of the wireless communication system, based upon information (for example, the traffic parameter and the transmission parameter) indicating the traffic condition in the wireless communication system, and the wireless transmission condition in which data, being is an object of communication, is transmitted.

Further, the wireless communication system, which is a wireless communication system (for example, the VoWLAN) for employing the MAC layer, thereby to make stream-type communication in a wireless environment accompanied by the data retransmission due to the wireless transmission error or a collision of data, which is accompanied by the random access, may include an evaluating means (which is, for example, realized by means of the probability computing section 22) for evaluating the transmission collision probability (for example, a collision probability $c_i$), the channel bandwidth utilization ratio (for example, the channel bandwidth utilization ratio $u_i$) and the channel vacant-bandwidth ratio (for example, the channel vacant-bandwidth ratio v) of the packet of each stream, based upon CODEC information and packet cycle time information (for example, a packet cycle time $t_i$) of each stream, and the wireless transmission rate and the transmission error ratio of a transmission source.

Further, the wireless communication system, which is a wireless communication system (for example, the VoWLAN) for employing the MAC layer, thereby to make stream-type communication in a wireless environment accompanied by the data retransmission due to the wireless transmission error or a collision of data, which is accompanied by the random access, may include an evaluating means (which is, for example, realized by means of the probability computing section 22) for, based upon CODEC information and packet cycle time information (for example, the packet cycle time $t_i$) of each stream, and the wireless transmission rate and the transmission error ratio of the transmission source, expressing a relation of the transmission collision probability (for example, the collision probability $c_i$), the channel bandwidth utilization ratio (for example, the channel bandwidth utilization ratio $u_i$) and the channel vacant-bandwidth ratio (for example, the channel vacant-bandwidth ratio v) of the packet of each stream in an equation to solve the equation, thereby to evaluate the transmission collision probability, the channel bandwidth utilization ratio and the channel vacant-bandwidth ratio of the packet of each stream.

Further, the wireless communication system, which is a wireless communication system (for example, the VoWLAN) for employing the MAC layer, thereby to make stream-type communication in a wireless environment accompanied by the data retransmission due to the wireless transmission error or a collision of data, which is accompanied by the random access, may include: a calculating means (which is, for example, realized by means of a probability computing section 22A) for, when a new call has occurred, obtaining the channel bandwidth utilization ratio (for example, the channel bandwidth utilization ratio $u_i$) and the channel vacant-bandwidth ratio (for example, the channel vacant-bandwidth ratio v) in having admitted the new call, according to a predetermined evaluation method; and a CAC (Call Admission Control) determining means (which is, for example, realized by means of a call receipt determiner 24) for determining whether or not the new call may be admitted, based upon a computation result of the channel bandwidth utilization ratio and the channel vacant-bandwidth ratio (for example, the channel bandwidth utilization ratio u having both of an up-stream and a down-stream taken into consideration) by the calculating means.

Further, the wireless communication system, which is a wireless communication system (for example, the VoWLAN) for employing the MAC layer, thereby to make stream-type communication in a wireless environment accompanied by the data retransmission due to the wireless transmission error or a collision of data, which is accompanied by the random access, may include: a calculating means (which is, for example, realized by means of the probability computing section 22B) for, when the traffic condition or the radio wave condition has changed due to a change in a state of a user terminal (for example, the wireless terminal 3), obtaining the channel bandwidth utilization ratio (for example, the channel bandwidth utilization ratio $u_i$) and the channel vacant-bandwidth ratio (for example, the channel vacant-bandwidth ratio v) in having executed a predetermined call control, according to a predetermined evaluation method; and an optimum control determining means (which is, for example, realized by means of an optimum control determiner 25) for determining whether or not the predetermined call control is an appropriate control, or determining whether or not the predetermined control is an optimum control, based upon a computation result (for example, the channel bandwidth utilization ratio u having both of the up-stream and the down-stream taken into consideration) of the channel bandwidth utilization ratio and the channel vacant-bandwidth ratio by the calculating means. Additionally, the so-called "determining an optimum control" is, for example, to specify an optimum transmission rate in some case, or to specify an optimum handover destination in some case.

Further, the wireless communication system, which is a wireless communication system (for example, the VoWLAN) for making stream communication that is accompanied by the random access, may include: an access point; and a channel bandwidth utilization ratio evaluating apparatus for evaluating a utilization ratio of a channel bandwidth of the wireless communication system (for example, a channel bandwidth utilization ratio evaluating server 1), and the channel bandwidth utilization ratio evaluating apparatus may include: a utilization ratio calculating means (which is, for example, realized by means of the probability computing sections 22, 22A, and 22B) for obtaining the channel bandwidth utilization ratio, being a utilization ratio at which data, being an object of communication, utilizes the bandwidth of the channel of the wireless communication system, based upon the traffic parameter (for example, the packet size and the packet cycle time), being a parameter indicating the traffic condition in the wireless communication system and the transmission parameter (for example, the transmission rate and the communication error ratio), being a parameter indicating the transmission condition in which data, being is an object of communication, is transmitted; and a utilization ratio evaluating means (which is, for example, realized by means of the call receipt determiner 24 and the optimum control determiner 25) for evaluating the channel bandwidth utilization ratio obtained by the utilization ratio calculating means.

Further, in the wireless communication system, the access point may include a determination request transmitting means (which is, for example, realized by means of a controller and a network interfacer of an access point 2) for, upon detecting occurrence of the new event (for example, occurrence of the new call or deterioration in a communication state), transmitting a request for determining a control that should be executed for the new event to the channel bandwidth utilization ratio evaluating apparatus, the utilization ratio calculating means, upon receiving the determination request from the access point, may obtain the channel bandwidth utilization ratio based upon the traffic parameter and the transmission parameter, and the utilization ratio evaluating means may include a control determining means (which is, for example, realized by means of the call receipt determiner 24 or the optimum control determiner 25) for, based upon the channel bandwidth utilization ratio obtained by the utilization ratio calculating means, determining the control (for example, the control as to whether or not the receipt of the new call is permitted) that should be executed for the new event.

Further, in the wireless communication system, the channel bandwidth utilization ratio evaluating apparatus may include a parameter acquiring means (which is, for example, realized by means of an inputting unit 10) for, upon receiving the determination request from the access point, acquiring a current traffic parameter and transmission parameter in the wireless communication system, and the utilization ratio calculating means may obtain the channel bandwidth utilization ratio based upon the current traffic parameter and transmission parameter obtained by the parameter acquiring means.

Further, in the wireless communication system, the parameter acquiring means, upon receiving the determination request from the access point, may receive CODEC information from an SIP server to extract the current traffic parameter and transmission parameter from the received CODEC information.

Further, in the wireless communication system, the determination request transmitting means may transmit to the channel bandwidth utilization ratio evaluating apparatus the current traffic parameter and transmission parameter that the access point is employing for communication with the user terminal, together with a request for determining a control that should be executed for the new event, and the parameter acquiring means may receive the current traffic parameter and transmission parameter from the access point in receiving the determination request from the access point.

Further, in the wireless communication system, the channel bandwidth utilization ratio evaluating apparatus may include a determination result transmitting means (which is, for example, realized by means of a result outputter 31, and control information outputters 32 and 32B) for transmitting a determination result by the control determining means to the access point, and the access point may include a control executing means (which is, for example, realized by means of the controller of the access point 2) for executing a predetermined control for the new event according to the determination result received from the channel bandwidth utilization ratio evaluating apparatus.

Further, in the wireless communication system, the access point may include a call receipt determination request transmitting means (which is, for example, realized by means of the controller and the network interfacer of the access point 2) for, upon detecting occurrence of the new call, transmitting a request for determining propriety on receipt of the new call to the channel bandwidth utilization ratio evaluating apparatus, the utilization ratio calculating means, upon receiving the determination request from the access point, may obtain the channel bandwidth utilization ratio based upon the traffic parameter and the transmission parameter, and the utilization ratio evaluating means may include a call receipt determining means (which is, for example, realized by means of the call receipt determiner 24) for determining whether or not receipt of the new call is permitted, based upon the channel bandwidth utilization ratio obtained by the utilization ratio calculating means.

Further, in the wireless communication system, the utilization ratio evaluating means may include a threshold determining means (which is, for example, realized by means of the call receipt determiner 24) for determining whether or not the channel bandwidth utilization ratio obtained by the utilization ratio calculating means is smaller than a predetermined threshold, and the call receipt determining means may determine that receipt of the new call is permitted when the threshold determining means determines that the channel bandwidth utilization ratio is smaller than a predetermined threshold.

Further, in the wireless communication system, the channel bandwidth utilization ratio evaluating apparatus may include a permission information transmitting means (which is, for example, realized by means of the control information outputter 32) for, when the call receipt determining means determines that receipt of the new call is permitted, transmitting call receipt permission information (for example, call receipt permission notification information) saying the effect that receipt of the new call is permitted to the access point, and the access point may includes: a permission information reception determining means (which is, for example, realized by means of the controller of the access point 2) for determining whether or not the call receipt permission information has been received from the channel bandwidth utilization ratio evaluating apparatus; and a call receipt controlling means (which is, for example, realized by means of the controller of the access point 2) for permitting receipt of the new call when the permission information reception determining means determines that the call receipt permission information has been received.

Further, in the wireless communication system, the access point may include a rate determination request transmitting means (which is, for example, realized by means of the controller and the network interfacer of the access point 2) for, upon detecting a deterioration in a communication state between the access point and the user terminal (for example, a decline in a signal level and an increase in a communication error ratio), transmitting a request for determining an optimum transmission rate to the channel bandwidth utilization ratio evaluating apparatus, the utilization ratio calculating means may calculate the channel bandwidth utilization ratio for each transmission rate, thereby to obtain a plurality of the channel bandwidth utilization ratios, and the utilization ratio evaluating means may include: a minimum value selecting means (which is, for example, realized by means of the optimum control determiner 25) for selecting the channel bandwidth utilization ratio that becomes minimized, from among a plurality of the channel bandwidth utilization ratios obtained by the utilization ratio calculating means; and an optimum rate specifying means (which is, for example, realized by means of the optimum control determiner 25) for specifying the transmission rate corresponding to the channel bandwidth utilization ratio selected by the minimum value selecting means as an optimum transmission rate.

Further, in the wireless communication system, the channel bandwidth utilization ratio evaluating apparatus may include a notification information transmitting means (which is, for example, realized by means of the control information outputter 32B) for transmitting notification information including the transmission rate specified by the optimum rate specifying means to the access point, and the access point may include a rate changing means (which is, for example, realized by means of the controller of the access point 2) for changing the transmission rate that is employed for communication between the access point and the user terminal, according to the transmission rate that is included in the notification information received from the channel bandwidth utilization ratio evaluating apparatus.

Further, in the wireless communication system, the access point may include a handover destination determination request transmitting means (which is, for example, realized by means of the controller and the network interfacer of the access point 2) for, upon detecting a deterioration in a communication state between the access point and the user terminal, transmitting a request for determining an optimum handover destination of the user terminal to the channel bandwidth utilization ratio evaluating apparatus, the utilization ratio calculating means may obtain respective channel bandwidth utilization ratios based upon the traffic parameter and the transmission parameter for each access point that is included in the wireless communication system, and the utilization ratio evaluating means may include: a minimum value selecting means (which is, for example, realized by means of the optimum control determiner 25) for selecting the channel bandwidth utilization ratio that becomes minimized, from among a plurality of the channel bandwidth utilization ratios obtained by the utilization ratio calculating means; and a handover destination specifying means (which is, for example, realized by means of the optimum control determiner 25) for specifying the access point corresponding to the channel bandwidth utilization ratio selected by the minimum value selecting means as an optimum handover destination.

Further, in the wireless communication system, the channel bandwidth utilization ratio evaluating apparatus may include a notification information transmitting means (which is, for example, realized by means of the control information outputter 32B) for transmitting notification information including the handover destination specified by the handover destination specifying means to the access point, and the access point may include a handover instructing means (which is, for example, realized by the controller of the access point 2) for instructing the user terminal, which is making communication with access point, to make handover according to the handover destination that is included in the notification information received from the channel bandwidth utilization ratio evaluating apparatus.

The channel bandwidth utilization ratio evaluating apparatus in accordance with the present invention, which is a channel bandwidth utilization ratio evaluating apparatus for evaluating the utilization ratio of the channel bandwidth of the wireless communication system for making stream communication, which is accompanied by the random access, is characterized in including: a utilization ratio calculating means for obtaining the channel bandwidth utilization ratio, being a utilization ratio at which the data, being an object of communication, utilizes the bandwidth of the channel of the wireless communication system, based upon the traffic parameter, being a parameter indicating the traffic condition in the wireless communication system, and the transmission parameter, being a parameter indicating the transmission condition in which data, being an object of communication, is transmitted; and a utilization ratio evaluating means for evaluating the channel bandwidth utilization ratio obtained by the utilization ratio calculating means.

The channel bandwidth utilization ratio evaluation program in accordance with the present invention, which is a channel bandwidth utilization ratio evaluation program for evaluating the utilization ratio of the channel bandwidth of the wireless communication system for making stream communication, which is accompanied by the random access, is for causing a computer to perform: a utilization ratio calculation process of obtaining the channel bandwidth utilization ratio, being a utilization ratio at which data, being an object of communication, utilizes the bandwidth of the channel of the wireless communication system, based upon the traffic parameter, being a parameter indicating the traffic condition in the wireless communication system, and the transmission parameter, being a parameter indicating the transmission condition in which data, being an object of communication, is transmitted; and a utilization ratio evaluation process of evaluating the obtained channel bandwidth utilization ratio.

Further, the channel bandwidth utilization ratio evaluation program may be a program for causing a computer: to perform a determination request reception process of, at the moment that occurrence of the new event has been detected, receiving a request for determining a control that should be executed for the new event from the access point; to perform a process, being a utilization calculation process, of obtaining the channel bandwidth utilization ratio based upon the traffic parameter and the transmission parameter upon receiving the determination request from the access point; and to perform a control determination process, being a utilization ratio evaluation process, of determining a control that should be executed for the new event based upon the obtained channel bandwidth utilization ratio.

Further, the channel bandwidth utilization ratio evaluation program may be a program for causing a computer: to perform a call receipt determination request reception process of, at the moment that occurrence of the new call has been detected, receiving a request for determining propriety on receipt of the new call from the access point; to perform a process, being a utilization ratio calculation process, of obtaining the channel bandwidth utilization ratio based upon the traffic parameter and the transmission parameter upon receiving the determination request from the access point; and to perform a call receipt determination process, being a utilization ratio evaluation process, of determining whether or not receipt of the new call is permitted, based upon the obtained channel bandwidth utilization ratio.

Further, the channel bandwidth utilization ratio evaluation program may be a program for causing a computer: to perform a threshold determination process, being a utilization ratio evaluation process, of determining whether or not the obtained channel bandwidth utilization ratio is smaller than a predetermined threshold; and to perform a process, being a call receipt determination process, of determining that receipt of the new call is permitted when it is determined in the threshold determination process that the channel bandwidth utilization ratio is smaller than a predetermined threshold.

Further, the channel bandwidth utilization ratio evaluation program may be a program for causing a computer: to perform a rate determination request reception process of, at the moment that a deterioration in the communication state between the access point and the user terminal has been detected, receiving a request for determining an optimum transmission rate from the access point; to perform a process, being a utilization ratio calculation process, of calculating the channel bandwidth utilization ratio for each transmission rate, thereby to obtain a plurality of the channel bandwidth utilization ratios; and to perform a minimum value selection process, being a utilization ratio evaluation process, of selecting the channel bandwidth utilization ratio that becomes minimized, from among a plurality of the channel bandwidth utilization ratios obtained in the utilization ratio calculation process, and an optimum rate specification process, being a utilization ratio evaluation process, of specifying the transmission rate corresponding to the channel bandwidth utilization ratio selected in the minimum value selection process as an optimum transmission rate.

Further, the channel bandwidth utilization ratio evaluation program may be a program for causing a computer: to perform a handover destination determination request reception process of, at the moment that a deterioration in the communication state between the access point and the user terminal has been detected, receiving a request for determining an optimum handover destination of the user terminal from the access point; to perform a process, being a utilization ratio calculation process, of obtaining respective channel bandwidth utilization ratios based upon the traffic parameter and the transmission parameter for each access point that is included in the wireless communication system; and to perform a minimum value selection process, being a utilization ratio evaluation process, of selecting the channel bandwidth utilization ratio that becomes minimized, among from a plurality of the channel bandwidth utilization ratios obtained in the utilization ratio calculation process, and a handover destination specification process, being a utilization ratio evaluation process, of specifying the access point corresponding to the channel bandwidth utilization ratio selected in the minimum value selection process as an optimum handover destination.

In accordance with the present invention, the channel bandwidth utilization ratio is obtained based upon the traffic parameter and the transmission parameter to evaluate the obtained channel bandwidth utilization ratio. This enables a change in the channel use situation of the wireless communication system and an influence upon the communication quality to be grasped on a real-time basis at the time that a change in the system condition has occurred due to occurrence of various events in the system for making stream communication that is accompanied by the random access. Accordingly, an influence of a change in the system condition upon the channel bandwidth utilization ratio can be evaluated precisely in the system for making stream communication that is accompanied by the random access.

Further, in the present invention, making a configuration so that, when a new event has been detected, the control that should be executed for the new event is determined based upon the channel bandwidth utilization ratio, and notification information including a determination result is transmitted to the access point makes it possible to carry out a control determination based upon the evaluation result of the channel bandwidth utilization ratio, and to control and administer the wireless resource in the system for making stream communication that is accompanied by the random access.

Further, in the present invention, making a configuration so that, when a new call has been detected, it is determined whether or not receipt of the new call is permitted based upon the channel bandwidth utilization ratio, and notification information including the determination result is transmitted to the access point makes it possible to carry out a call receipt control determination based upon the evaluation result of the channel bandwidth utilization ratio, and to control and administer the wireless resource in the system for making stream communication that is accompanied by the random access.

Further, in the present invention, making a configuration so that, when a deterioration in the communication state has been detected, the optimum transmission rate is specified based upon the channel bandwidth utilization ratio, and notification information including the specified transmission rate is transmitted to the access point makes it possible to carry out a optimum transmission rate determination based upon the evaluation result of the channel bandwidth utilization ratio, and to control and administer the wireless resource in the system for making stream communication that is accompanied by the random access.

Further, in the present invention, making a configuration so that, when a deterioration in the communication state has been detected, the optimum handover destination is specified based upon the channel bandwidth utilization ratio, and notification information including the specified optimum handover destination is transmitted to the access point makes it possible to carry out a optimum handover destination determination based upon the evaluation result of the channel bandwidth utilization ratio, and to control and administer the wireless resource in the system for making stream communication that is accompanied by the random access.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Embodiment 1

Figure 1:
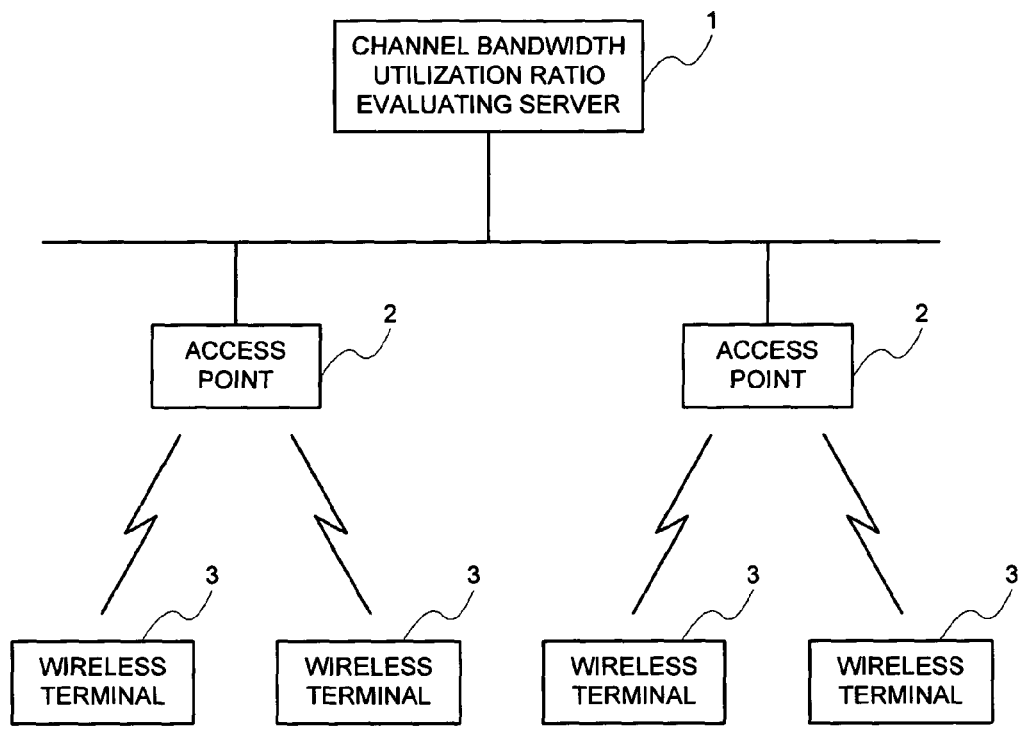
FIG. 1 is a block diagram illustrating one example of a configuration of the wireless communication system employing the channel bandwidth utilization ratio evaluation method in accordance with the present invention.

Hereinafter, a first embodiment of the present invention will be explained by making a reference to the accompanied drawings. FIG. 1 is a block diagram illustrating one example of a configuration of the wireless communication system employing the channel bandwidth utilization ratio evaluation method in accordance with the present invention. As shown in FIG. 1, the wireless communication system includes a channel bandwidth utilization ratio evaluating server 1, access points 2 and wireless terminals 3.

In this embodiment, the case that the channel bandwidth utilization ratio evaluating method is applied for the wireless communication system having the MAC layer that is accompanied by the random access will be explained. Further, in this embodiment, the wireless communication system is a wireless LAN (VoWLAN) for making communication of the voice stream. The wireless communication system is employed, for example, in the application for providing an IP telephone service employing the VoWLAN.

Additionally, the wireless communication system is the system for making communication of the voice stream; however it is not limited hereto. For example, the channel bandwidth utilization ratio evaluating method may be applied to the wireless communication system for making communication of the video stream on the premise that it is the communication system for making communication of various streams, which is accompanied by the random access.

The channel bandwidth utilization ratio evaluating server 1 is specifically realized by means of the information processing unit such as a workstation and a personal computer. The channel bandwidth utilization ratio evaluating server 1, which is connected to each access point 2, has a function of inputting information of various traffic conditions and information of various transmission conditions from the access point 2. Further, the channel bandwidth utilization ratio evaluating server 1 has a function of obtaining/evaluating a channel bandwidth utilization ratio u indicating a rate (utilization ratio) at which each voice stream utilizes the channel bandwidth of the VoWLAN based upon information input from each access point 2. Further, the channel bandwidth utilization ratio evaluating server 1 has a function of obtaining a channel vacant-bandwidth ratio v indicating a rate of the vacant bandwidth over the bandwidth of the channel of the VoWLAN that is an object of evaluation. Further, the channel bandwidth utilization ratio evaluating server 1 has a function of obtaining a collision probability c indicating a probability at which each stream collides in the VoWLAN that is an object of evaluation.

Additionally, in this embodiment, the so-called "evaluating a channel bandwidth utilization ratio" is to performing various determination processes based upon the obtained channel bandwidth utilization ratio. For example, in a case where the access point 2 has detected the new call, the channel bandwidth utilization ratio evaluating server 1 determines whether or not the call that has occurred newly should be admitted, based upon the obtained channel bandwidth utilization ratio.

The access point (AP) 2 has a function of transmitting/receiving a wireless signal to/from each wireless terminal 3, and yet has a function of, in a case where a new call has occurred from each terminal 3, taking a receipt control (CAC control (Call Admission Control)) of the call that has occurred newly and a control for connection to the wireless terminal 3, being a incoming destination. Further, the access point 2 has a function of transmitting information of various traffic conditions and transmission conditions to the channel bandwidth utilization ratio evaluating server 1 at the time that the event has occurred, for example, in the case that the new call has occurred, or the like. Additionally, in FIG. 1, two access points 2 are shown; however the number of the access point 2 that is included in the wireless communication system is not limited hereto. For example, the wireless communication system may include three or more access points 2.

The wireless terminal 3 is specifically realized by means of the information processing terminal such as a mobile telephone, a PDA, a personal computer. In this embodiment, the wireless terminal 3 has a function of transmitting/receiving the voice stream as the wireless signal. That is, in this embodiment, the wireless terminal 3 is employed as the voice communication leased-terminal for making communication of only the voice stream. Additionally, in FIG. 1, two wireless terminals 3 are shown for each access point 2; however the number of the wireless terminal 3 for each access point 2 is not limited hereto. For example, the wireless communication system may include three or more wireless terminal 3 for each access point 2.

Figure 2:
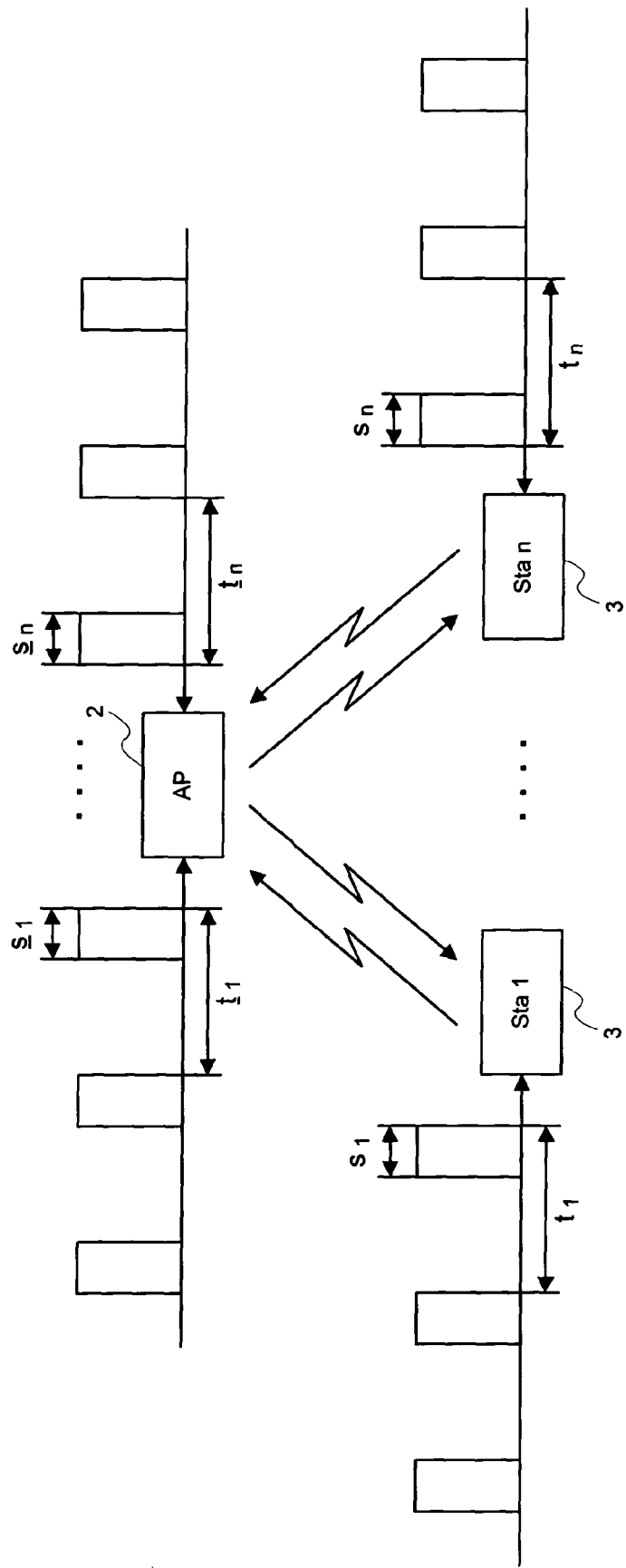
FIG. 2 is an explanatory view illustrating the VoWLAN system that becomes an object of evaluation.

Next, the VoWLAN system that becomes an object of evaluation by the channel bandwidth utilization ratio evaluating server 1 will be explained. FIG. 2 is an explanatory view illustrating the VoWLAN system that becomes an object of evaluation in this embodiment. In this embodiment, it is assumed that the wireless LAN accommodating only the voice terminal (in this example, the wireless terminal 3) is an object system of evaluation. Herein, the voice communication by each wireless terminal 3 is carried out only via the access point 2. In this embodiment, it is assumed that one terminal is caused to generate one voice call for explanatory convenience. Further, it is assumed that each voice call is configured of two of an upward-direction (i.e. a direction of transmission from the wireless terminal 3 to the access point (terminal→AP)) stream and a down-direction (i.e. a direction of transmission from the access point to the wireless terminal 3 (AP→terminal)) stream. Further, it is assumed that the constant-sized packet arrives (is transmitted/received) cyclically as each stream.

The channel bandwidth utilization ratio evaluating method in accordance with the present invention can be applied to the wireless system that is accompanied by various random accesses. Herein, the case of applying the channel bandwidth utilization ratio evaluating method to the wireless LAN, being the wireless LAN in accordance with the IEEE 802.11 standard, which has the basic technique of the MAC layer protocol, being a DCF (Distributed Coordination Function) technique, packaged, will be explained. Hereinafter, before this embodiment is explained, at first, the general DCF technique will be explained.

In a case where there exists data that is to be transmitted, at first, the wireless terminal 3 or the access point 2 checks the situation of the (wireless) channel. In this case, the wireless terminal 3 or the access point 2 determines that the situation of the channel is "busy" when at least one terminal/access point is making data transmission, and that the situation other than this is "vacant" (the case that no terminal/access point is making data transmission).

In trying to make data communication, in a case where it has been judged that the channel is "vacant", the terminal/access point transmits one packet when a continuous-vacancy time of its channel reaches a predetermined period that is called a DIFS (DCF interframe space) period.

Further, in a case where it has been judged that the channel is "busy", the terminal/access point waits until the channel comes into the vacant state. And, the terminal/access point waits at first until the DIFS period expires since the channel has come into the vacant state, further waits until a backoff period of a random length expires, and then transmits one packet. In this case, if the channel comes into the busy state again before the DIFS period expires, the terminal/access point waits until the channel comes into the vacant state again, and repeats the above-mention process. Further, when the channel comes into the busy state during the backoff period, the terminal/access point suspends the countdown of a timer of the backoff until, in the next place, the channel comes into the vacant state again and yet the DIFS period expires. And, when the DIFS period expires, and yet the remaining time of the backoff (the remaining time after suspending the countdown of the timer) expires, the terminal/access point transmits one packet.

In a case where the terminal/access point in the reception side has correctly received the packet transmitted from the terminal/access point in the transmission side, it sends back (transmits) an ACK packet for confirmation after a predetermined period called a SIFS (short interframe space) period expires. Additionally, the SIFS is shorter than the DIFS in the period.

Further, the backoff length is determined by (random number)×(basic slot length). Herein, the "random number" follows a uniform distribution over a section [0, CW]. Further, the CW, which is a window parameter, is doubled whenever data is retransmitted due to a failure in transmission. In this case, the CW is doubled within the limits of a certain predetermined value. Additionally, the value of each parameter mentioned above (the DIFS, the SIFS, and the slot length) is decided according to the physical layer. For example, in a case of employing the IEEE 802.11b standard, with each parameter, it is decided that DIFS=50 μs, SIFS=10 μs, and slot length σ=20 μs, respectively.

Further, several transmission rates are specified in the specification of the physical layer of the IEEE 802.11, and the wireless terminal 3 or the access point 2 selects one of the rates specified in the IEEE 802.11 as the transmission rate that is actually employed, according to the communication situation.

Figure 3:
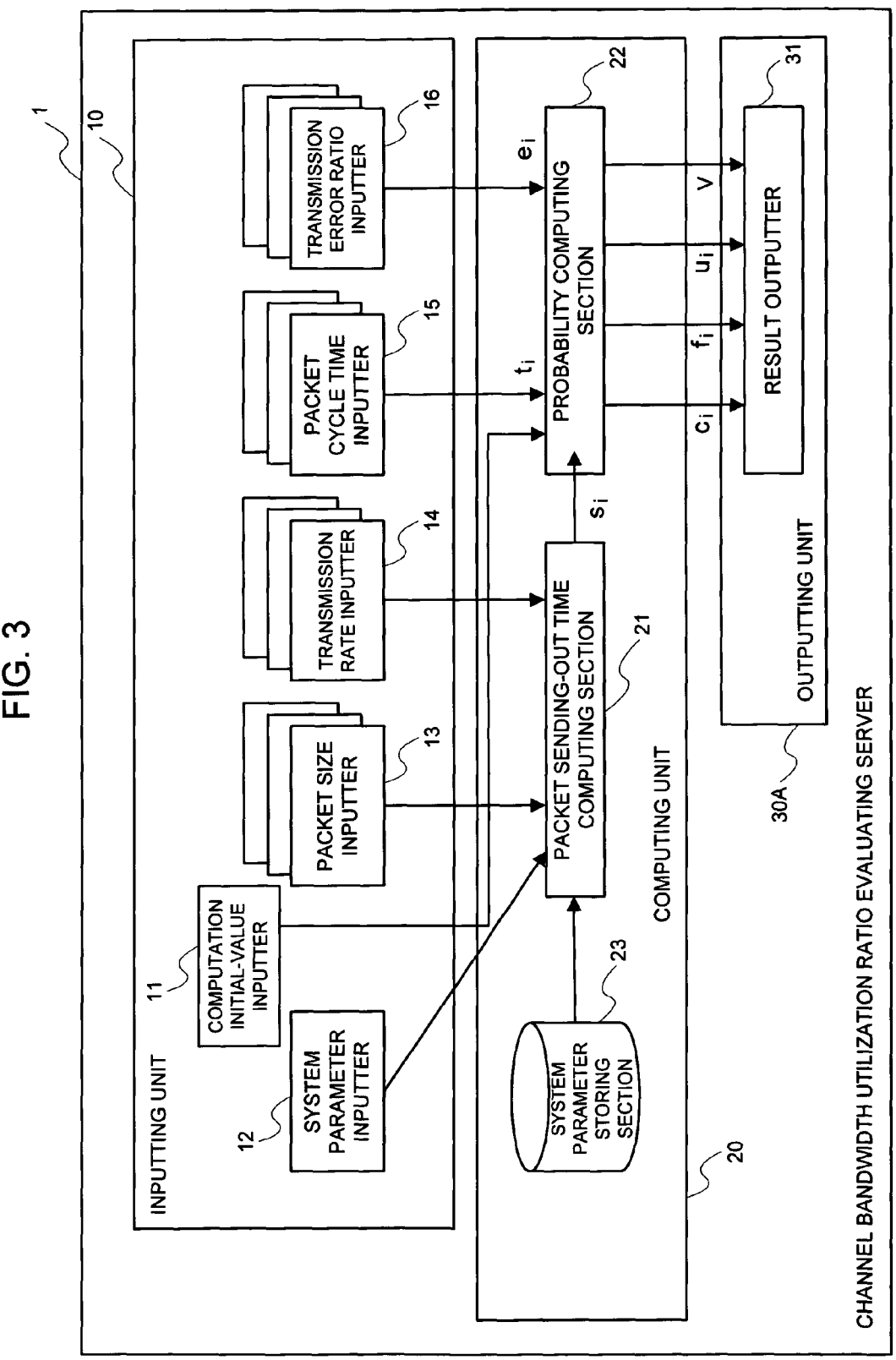
FIG. 3 is a block diagram illustrating one example of a configuration of the channel bandwidth utilization ratio evaluating server.

Next, a configuration of the channel bandwidth utilization ratio evaluating server 1 will be explained. FIG. 3 is a block diagram illustrating one example of the configuration of the channel bandwidth utilization ratio evaluating server. As shown in FIG. 3, the channel bandwidth utilization ratio evaluating server 1 includes an inputting unit 10, a computing unit 20 and an outputting unit 30.

The inputting unit 10 is specifically realized by means of the CPU of the information processing unit that operates according to the program, and the network interfacer. The inputting unit 10 has a function of, at the moment that the event such as occurrence of the new call has occurred, inputting each parameter, which has the system condition of the VoWLAN reflected, from each access point 2. In this embodiment, the inputting unit 10 inputs the traffic parameter, being a parameter indicating a predetermined traffic condition in the wireless communication system (the VoWLAN). For example, the inputting unit 10 inputs the packet size or the packet cycle time of the packet that is transmitted/received in the wireless communication system as the traffic parameter. Further, the inputting unit 10 inputs the transmission parameter, being a parameter indicating a predetermined transmission condition in which data, being is an object of communication, is transmitted. For example, the inputting unit 10 inputs the transmission rate or the communication error ratio in each access point 2 as the transmission parameter.

Further, as shown in FIG. 3, the inputting unit 10 includes a computation initial-value inputter 11, a system parameter inputter 12, a packet size inputter 13, a transmission rate inputter 14, a packet cycle time inputter 15 and a transmission error ratio inputter 16.

The computation initial-value inputter 11 has a function of inputting a predetermined initial-value that is employed for the computation process for calculating the channel bandwidth utilization ratio u, the channel vacant-bandwidth ratio v, and the collision probability c. For example, the computation initial-value inputter 11 inputs a predetermined initial-value i in advance according to a system administrator's operation in installing the VoWLAN system. In this embodiment, the computation initial-value inputter 11 inputs an initial value $v_0$ of the channel vacant-bandwidth ratio v, which the computing unit 20 is caused to pre-store.

The system parameter inputter 12 has a function of inputting various system parameters of the VoWLAN. In this embodiment, the system parameter inputter 12 inputs the system parameters in advance such as the DIFS, the SIFS and the slot length (slot size) σ from each access point 2 in stalling the VoWLAN system. And, the system parameter inputter 12 causes the computing unit 20 to pre-store each input system parameter.

The packet size inputter 13 has a function of, at the moment that the event such as occurrence of the new call has occurred, inputting the packet size for each stream from CODEC information or an observation of communication. For example, the packet size inputter 13 receives the CODEC information from an SIP server (not shown in the figure) that the wireless communication system includes, and extracts the packet size for each stream from the received CODEC information. Further, for example, the packet size inputter 13 receives the packet size for each stream from each access point 2 at the moment that the event has occurred.

The transmission rate inputter 14 has a function of, at the moment that the event such as occurrence of the new call has occurred, inputting the transmission rate for each stream from the CODEC information or the observation of communication. For example, the transmission rate inputter 14 receives the CODEC information from the SIP server that the wireless communication system includes, and extracts the transmission rate for each stream from the received CODEC information. Further, for example, the transmission rate inputter 14 receives the transmission rate for each stream from each access point 2 at the moment that the event has occurred.

The packet cycle time inputter 15 has a function of, at the moment that the event such as occurrence of the new call has occurred, inputting the cycle time of the packet for each stream from the CODEC information or the observation of communication. For example, the packet cycle time inputter 15 receives the CODEC information from the SIP server that the wireless communication system includes, and extracts the cycle time of the packet for each stream from the received CODEC information. Further, for example, the packet cycle time inputter 15 receives the cycle time of the packet for each stream from each access point 2 at the moment that the event has occurred.

The transmission error ratio inputter 16 has a function of, at the moment that the event such as occurrence of the new call has occurred, inputting the transmission error ratio for each stream from the CODEC information or the observation of communication. For example, the transmission error ratio inputter 16 receives the CODEC information from the SIP server that the wireless communication system includes, and extracts the transmission error ratio for each stream from the received CODEC information. Further, for example, the transmission error ratio inputter 16 receives the transmission error ratio for each stream from each access point 2 at the moment that the event has occurred.

The computing unit 20 has a function of, upon inputting each parameter from the inputting unit 10, computing a characteristic value associated with the channel use situation and the communication quality. For example, the computing unit 20 computes the collision probability c, the packet failure-in-transmission retransmission ratio, the channel use ratio (channel bandwidth utilization ratio u), the vacant bandwidth ratio of the channel (channel vacant-bandwidth ratio v), etc. for each stream based upon the traffic parameter and the transmission parameter. Further, as shown in FIG. 3, the computing unit 20 includes a packet sending-out time computing section 21, a probability computing section 22, and a system parameter storing section 23.

The packet sending-out time computing section 21 is specifically, realized by means of the CPU of the information processing unit that operates according to the program. The packet sending-out time computing section 21 includes a function of calculating the packet sending-out channel time indicating the time for transmitting the packet stream by stream based upon the system parameter, the packet size, and the transmission rate.

The probability computing section 22 is specifically realized by means of the CPU of the information processing unit that operates according to the program and the memory device. The probability computing section 22 has a function of obtaining various characteristic values based upon the cycle time of the packet, the transmission error ratio, and the packet sending-out channel time. For example, the probability computing section 22 obtains the collision probability c, the retransmission probability (the packet failure-in-transmission retransmission ratio), the use ratio (channel bandwidth utilization ratio u), and the vacant bandwidth ratio (channel vacant-bandwidth ratio v) as the characteristic value.

The system parameter storing section 23 is specifically realized by means of the memory device such as a magnetic disc unit, and a memory. The system parameter storing section 23 pre-stores each of the system parameters such as the DIFS, the SIFS, the slot length (slot size) σ. For example, the system parameter storing section 23 stores each system parameter input by the system parameter inputter 12 in having installed the VoWLAN system.

The outputting unit 30 is specifically realized by means of the CPU of the information processing unit that operates according to the program, and the network interfacer. The outputting unit 30 has a function of outputting each computation result obtained by the computing unit 20. For example, the outputting unit 30 outputs the computation result obtained by the computing unit 20 to each access point 2, and controls each access point 2. Additionally, the outputting unit 30 may output the computation result obtained by the computing unit 20, for example, by displaying it in a displaying unit such as a display.

Figure 4:
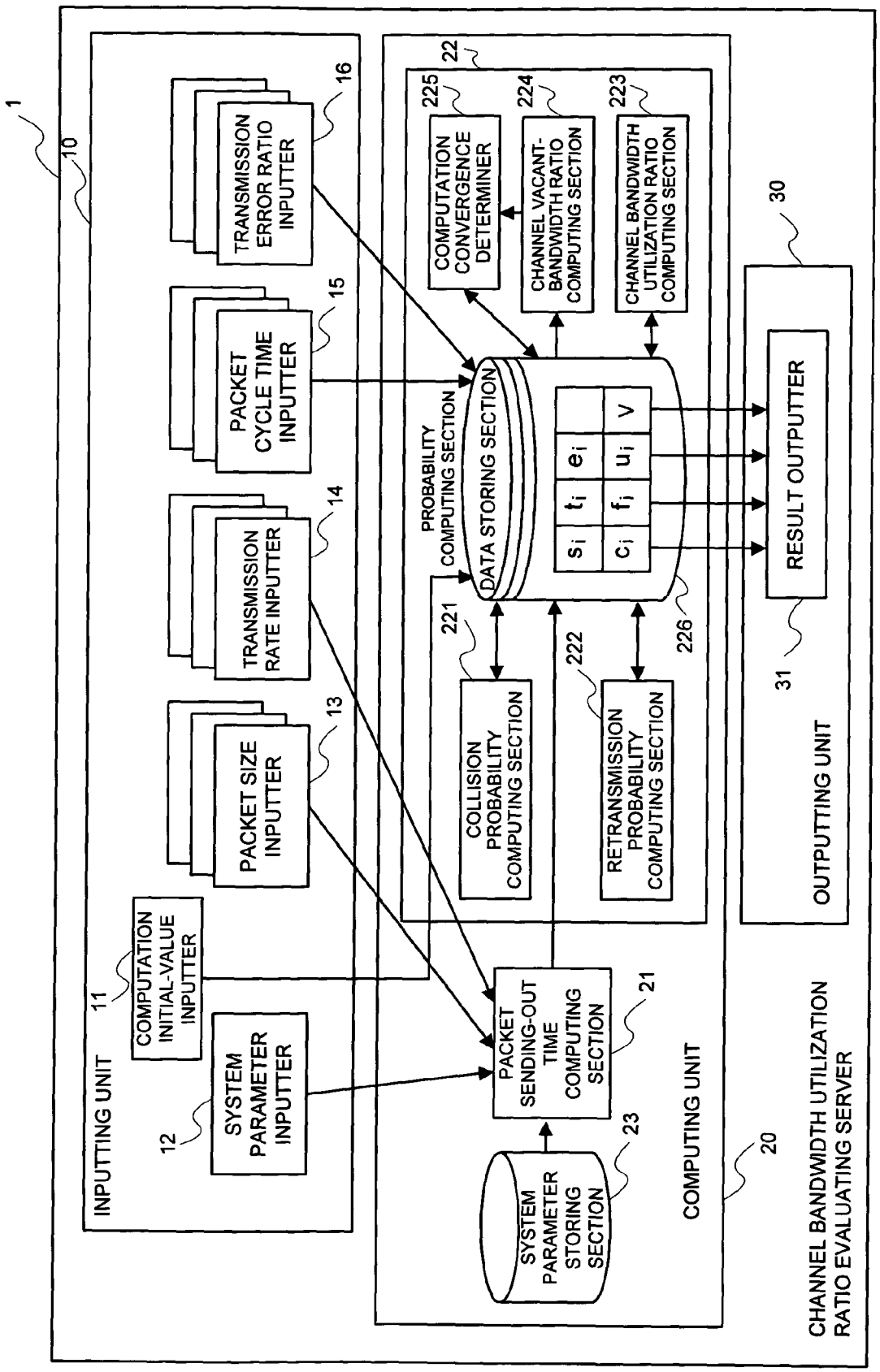
FIG. 4 is a block diagram illustrating the more detailed configuration of the probability computing section 22 that the computing unit 20 includes.

FIG. 4 is a block diagram illustrating the more detailed configuration of the probability computing section 22 that the computing unit 20 includes. As shown in FIG. 4, the probability computing section 22 includes a collision probability computing section 221, a retransmission probability computing section 222, a channel bandwidth utilization ratio computing section 223, a channel vacant-bandwidth ratio computing section 224, a computation convergence determiner 225, and a data storing section 226.

The collision probability computing section 221, the retransmission probability computing section 222, the channel bandwidth utilization ratio computing section 223, the channel vacant-bandwidth ratio computing section 224, and the computation convergence determiner 225 are specifically realized by means of the CPU of the information processing unit that operates according to the program, respectively. The collision-probability computing section 221 has a function of obtaining the collision probability $c_i$ for each stream. The retransmission probability computing section 222 has a function of obtaining the retransmission probability $f_i$ for each stream. The channel bandwidth utilization ratio computing section 223 has a function of obtaining the channel bandwidth utilization ratio $u_i$ for each stream. The channel vacant-bandwidth ratio computing section 224 has a function of obtaining the channel vacant-bandwidth ratio v for each stream.

The computation convergence determiner 225 has a function of determining whether or not the value of the channel vacant-bandwidth ratio v calculated by the channel vacant-bandwidth ratio computing section 224 satisfies a predetermined convergence condition, being a condition for finishing the computation process.

The data storing section 226 is specifically realized by means of the memory device such as a magnetic disc unit and a memory. The data storing section 226 stores a cycle time $t_i$ of the packet and a transmission error ratio $e_i$ input from the inputting unit 10. Further, the data storing section 226 stores a packet sending-out channel time $s_i$ obtained by the packet sending-out time computing section 21. Further, the data storing section 226 stores the computation initial-value (for example, the channel vacant-bandwidth ratio initial-value $v_0$) input from the inputting unit 10. Further, the data storing section 226 stores a collision probability $c_i$ obtained by the collision probability computing section 221. Further, the data storing section 226 stores a retransmission probability $f_i$ obtained by the retransmission probability computing section 222. Further, the data storing section 226 stores the channel bandwidth utilization ratio $u_i$ obtained by the channel bandwidth utilization ratio computing section 223. Further, the data storing section 226 stores the channel vacant-bandwidth ratio v obtained by the channel vacant-bandwidth ratio computing section 224.

Additionally, in this embodiment, the memory device (not shown in the figure) of the channel bandwidth utilization ratio evaluating server 1 stores various programs for performing the process of evaluating the channel bandwidth utilization ratio. For example, the memory device of the channel bandwidth utilization ratio evaluating server 1 stores a channel bandwidth utilization ratio evaluation program for causing the computer to perform: a utilization ratio calculation process of obtaining the channel utilization ratio, being a utilization ratio at which data, being an object of communication, utilizes the bandwidth of the channel of the wireless communication system; and a utilization ratio evaluation process of evaluating the obtained channel bandwidth utilization ratio based upon the traffic parameter, being a parameter indicating a predetermined traffic condition in the wireless communication system, and the transmission parameter, being a parameter indicating a predetermined transmission condition in which data, being is an object of communication, is transmitted.

Figure 5:
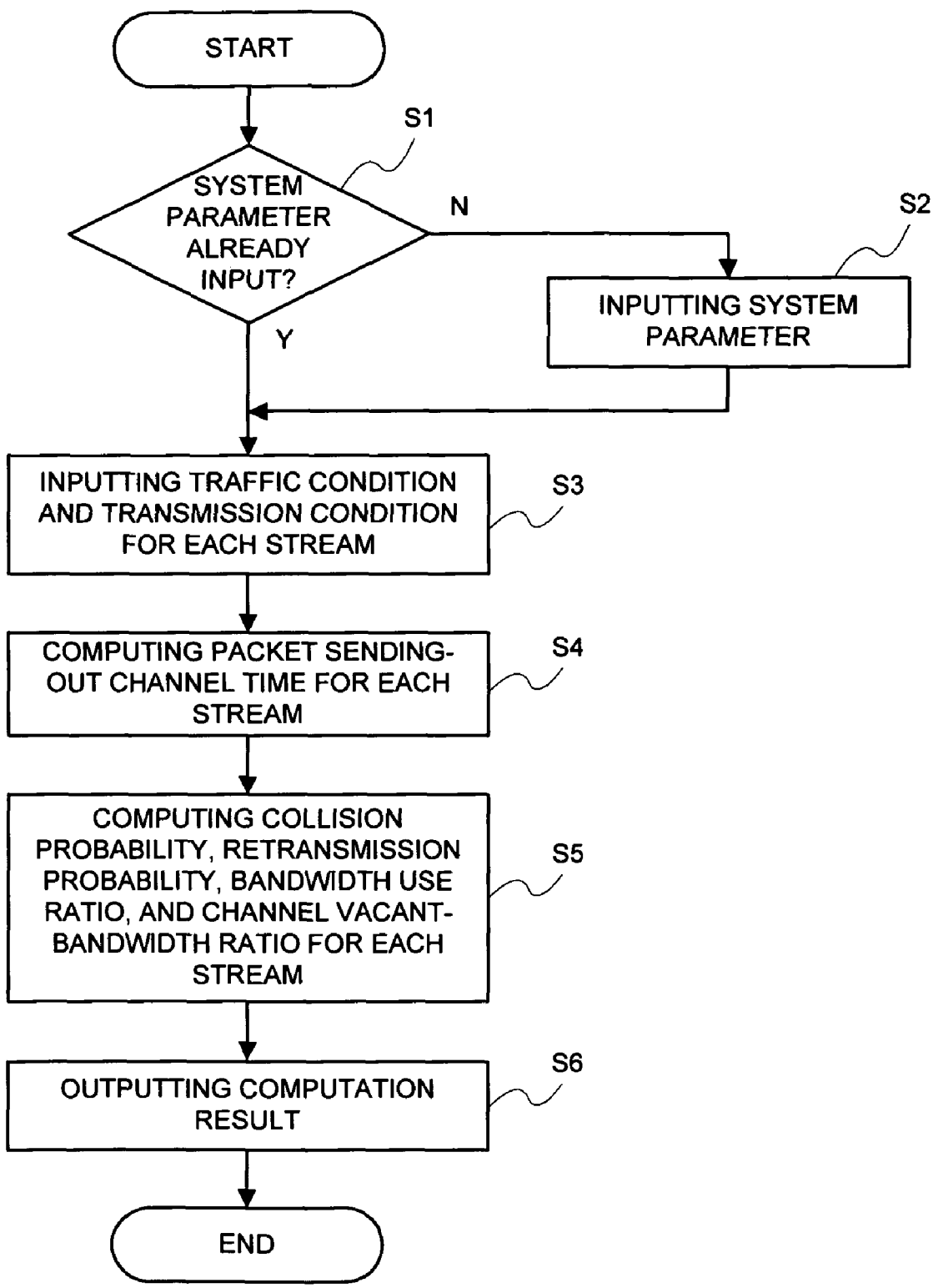
FIG. 5 is a flowchart illustrating one example of a channel bandwidth utilization ratio evaluation process of obtaining and evaluating the channel bandwidth utilization ratio.

Next, an operation will be explained. FIG. 5 is a flowchart illustrating one example of the channel bandwidth utilization ratio evaluation process of obtaining/evaluating the channel bandwidth utilization ratio. In the wireless communication system, when any of the access points 2 detects occurrence of the new event, it transmits a request for executing an evaluation of the channel bandwidth utilization ratio to the channel bandwidth utilization ratio evaluating server 1. For example, when the access point 2 detects occurrence of the new call, it transmits a request for determining propriety on the call receipt based upon the channel bandwidth utilization ratio to the channel bandwidth utilization ratio evaluating server 1.

Upon receiving the execution request of the evaluation, at first, the channel bandwidth utilization ratio evaluating server 1 draws a conclusion as to whether or not the values of various parameters relating to the system specification (the foregoing slot size σ, DIFS, and SIFS, and the parameter associated with the overhead of the physical layer and the MAC layer (for example, a MAC header size and a physical layer overhead time)) have already been inputted (step S1). In this embodiment, the channel bandwidth utilization ratio evaluating server 1 draws a conclusion as to whether or not each parameter has been stored in the system parameter storing section 23. It is enough that these system parameters are input once at the beginning because there is no dynamic change therein (that is, no value changes even though the time elapses). For this, in a case where the system parameter has been already input, there is no necessity for re-inputting the system parameter in evaluating the channel bandwidth utilization ratio.

When the channel bandwidth utilization ratio evaluating server 1 judges that the system parameter has already been input, it proceeds to a step S3 without taking any step. When the channel bandwidth utilization ratio evaluating server 1 judges that the system parameter has not been input yet, the inputting unit 10 thereof inputs these system parameters (step S2), and proceeds to the step S3. In this case, for example, the channel bandwidth utilization ratio evaluating server 1 displays the effect that the system parameter has not been input yet in the display etc. and urges the system administrator to input the system parameter. And, the inputting unit 10 inputs each system parameter according to a system administrator's operation.

Next, the inputting unit 10 inputs the parameter (traffic parameter) indicating the traffic condition and the parameter (transmission parameter) indicating the transmission condition for each stream in the upward direction and the down direction, respectively (step S3). Specifically, the inputting unit 10 inputs the packet size and the packet cycle time as the parameter indicating the traffic condition. In this embodiment, the packet size inputter 13 of the inputting unit 10 inputs the packet size, and the packet cycle time inputter 15 thereof inputs the packet cycle time. Further, the inputting unit 10 inputs the wireless transmission rate and the error ratio of the packet as the parameter indicating the transmission condition. In this embodiment, the transmission rate inputter 14 inputs the transmission rate, and the transmission error ratio inputter 16 inputs the transmission error ratio.

Further, the inputting unit 10 can acquire the parameter indicating the traffic condition and the transmission condition from the CODEC information or the observation of communication. For example, the inputting unit 10 receives the CODEC information from the SIP server that the wireless communication system includes. And, the inputting unit 10 extracts the parameter indicating the traffic condition and the transmission condition from the received CODEC information. Further, for example, when the access point 2 detects the event such as occurrence of the new call, it obtains the packet cycle time and the transmission error ratio, and transmits the parameter indicating the traffic condition and the transmission condition to the channel bandwidth utilization ratio evaluating server 1. And, the inputting unit 10 receives the parameter indicating the traffic condition and the transmission condition from the access point 2.

The packet sending-out time computing section 21 of the computing unit 20 computes the channel time (packet sending-out channel time) indicating the time for utilizing the channel of the wireless communication system in order to send out (transmit) one packet stream by stream, base upon the input information input in the step S3 (step S4). In this case, the packet sending-out time computing section 21 obtains the packet sending-out time based upon each system parameter, the packet size and the transmission rate. The packet sending-out time includes the DIFS period, the SIFS period, the time for sending out the ACK, and the time for transmitting various overheads of the physical layer and the MAC layer of the other terminal in addition to the data transmission time for actually making data transmission. That is, the packet sending-out time is the total of the time during which transmission of the packet by one transmission terminal prevents the other terminal from transmitting the packet. Specifically, the packet sending-out time computing section 21 obtains the packet sending-out channel time by employing Equation 1 with the packet sending-out channel time of a stream i assumed to be $s_i$.

[Numeral equation 1]

$$s_i = \frac{DIFS + SIFS + \text{physical-layer overhead time} + \frac{MAC \text{ head size} + \text{packet size}}{\text{transmission rate}}}{\sigma} \quad \text{Equation (1)}$$

In Equation (1), the packet sending-out channel time $s_i$ is obtained with the slot length σ as a time unit. With the wireless LAN, data is substantially synchronized in a slot unit for transmission. For this, in this embodiment, for convenience of computing the collision probability, unless the other kind of the time unit is definitely expressed in particular, it is assumed that the packet sending-out channel time $s_i$ and the packet cycle time $t_i$ is obtained with the slot length σ as a time unit.

Further, the probability computing section 22 computes each probability based upon the input information input in the step S3 and the packet sending-out channel time $s_i$ obtained by the packet sending-out time computing section 21 (step S5). Hereinafter, in the step S5, how the probability computing section 22 computes each probability will be explained.

At first, a relational equation will be explained of theses probabilities (for example, the collision probability, the channel bandwidth utilization ratio, and the channel vacant-bandwidth ratio of the stream) on the presumption that the system is stable. Additionally, the so-called "the system is stable" signifies the state that no packet loss due to a shortage of the processing capacity of the system occurs constantly. Further, the so-called "the system is stable" signifies the state that no increase in a delay of the packet with a lapse of time occurs.

If the system is stable, the transmission error ratio $e_i$ and the collision probability $c_i$ of the stream i are also stable. In a case where the retransmission at the time of failure in transmission due to the transmission error or the collision is carried out, the retransmission probability computing section 222 can obtain the retransmission probability $f_i$ of an up-stream i by employing equation (2).

[Numeral Equation 2]

$$f_i = 1 - (1-e_i)(1-c_i), i=1, \ldots, n \quad \text{Equation (2)}$$

Further, likewise, the retransmission probability computing section 222 can obtain the retransmission probability ($f_i$ with an underbar symbol) of a down-stream i by employing equation (3). Additionally, in this embodiment, in a case of comprehensively expressing the retransmission probability in the upward direction and in the downward direction of the stream i, it is expressed simply as the retransmission probability $f_i$.

[Numeral Equation 3]

$$\underline{f_i} = 1 - (1-e_i)(1-c_o), i=1, \ldots, n \quad \text{Equation (3)}$$

However, in a case where no retransmission of the packet occurs, $f_i=0$. Further, in Equation (3), the collision probability is expressed as $c_o$ because the collision probability of the down-stream has the value in common.

Further, in a case where the system is stable, with the stream i, one packet is normally sent out (transmitted) for each cycle time $t_i$ on the average. Thus, the channel bandwidth utilization ratio computing section 223 can obtain the channel utilization ratio (channel bandwidth utilization ratio $u_i$) of the up-stream i having occurrence of the retransmission of the packet taken into consideration by employing Equation (4).

[Numeral equation 4]

$$u_i = \frac{s_i}{t_i(1-f_i)}, i=1, \ldots, n \quad \text{Equation (4)}$$

Further, the channel bandwidth utilization ratio computing section 223 can obtain the channel utilization ratio (channel bandwidth utilization ratio ($u_i$ with an underbar symbol)) of the down-stream i by employing Equation (5). Additionally, in this embodiment, in a case of comprehensively expressing the channel bandwidth utilization ratio in the upward direction and in the downward direction of the stream i, it is also expressed simply as the channel bandwidth utilization ratio $u_i$.

[Numeral equation 5]

$$\underline{u_i} = \frac{s_i}{t_i(1-\underline{f_i})}, i=1, \ldots, n \quad \text{Equation (5)}$$

Further, the channel vacant-bandwidth computing section 224 can compute the channel vacant-bandwidth ratio v easily based upon the channel utilization ratio (the channel bandwidth utilization ratio $u_i$). Specifically, the channel vacant-bandwidth computing section 224 can obtain the channel vacant-bandwidth ratio v by employing Equation (6).

[Numeral equation 6]

$$v = 1 - \sum_{i=1}^{n}(u_i + \underline{u_i}) \quad \text{Equation (6)}$$

Herein, think about the collision probability of the stream i. At the moment of starting to transmit the packet of the stream i, the collision of the packet of its stream i occurs in starting to transmit the packet of the stream from the other terminal as well employing the identical slot simultaneously therewith. Additionally, when the transmission start slot is different (for example, when the other terminal is going to start the packet transmission with the subsequent slot), the other terminal can listen to the transmission of the packet that goes ahead, thereby making it possible to stop the packet that is to be transmitted later, which prevents the collision from occurring.

On the other hand, due to the element that the backoff in the DCF technique is random, or the like, it follows that the packet by a stream j of the other terminal is sent out (transmitted) at a random timing. That is, it can be thought that the probability that the other terminal selects, by chance, the slot identical to the packet transmission start slot of the stream i from among the vacant slots within the packet cycle time $t_j$, thereby to start the packet transmission is $1/(vt_j+1)$. Additionally, with this probability $1/(vt_j+1)$, one slot that is employed for the transmission start is also included in its denominator as an element besides the within-cycle time average-vacant-slot number $vt_j$. Thus, if it is assumed that the transmission by each terminal is carried out independently, the collision prob ability computing section 221 can obtain the collision probability $c_i$ by employing Equation (7).

[Numeral equation 7]
$$c_i = 1 - \prod_{j \neq i}\left(1 - \frac{1}{vf_j + 1}\right), i = 0, 1, \ldots, n \quad \text{Equation (7)}$$

As mentioned above, Equation (2) to Equation (7) are an equation as to the collision probability (c), the retransmission probability (f), the channel bandwidth utilization ratio (u), and the channel vacant-bandwidth ratio (v), respectively. And, each of the computing sections 221, 222, 223, and 224 of the probability computing section 22 can solve each variable number numerically by employing predetermined computation algorithm. For example, each of the computing sections 221, 222, 223, and 224 of the probability computing section 22 employs the computation algorithm such as an iterative assignment method, a Newton method, and a binary chop method, thereby to obtain the variable number.

Figure 6:
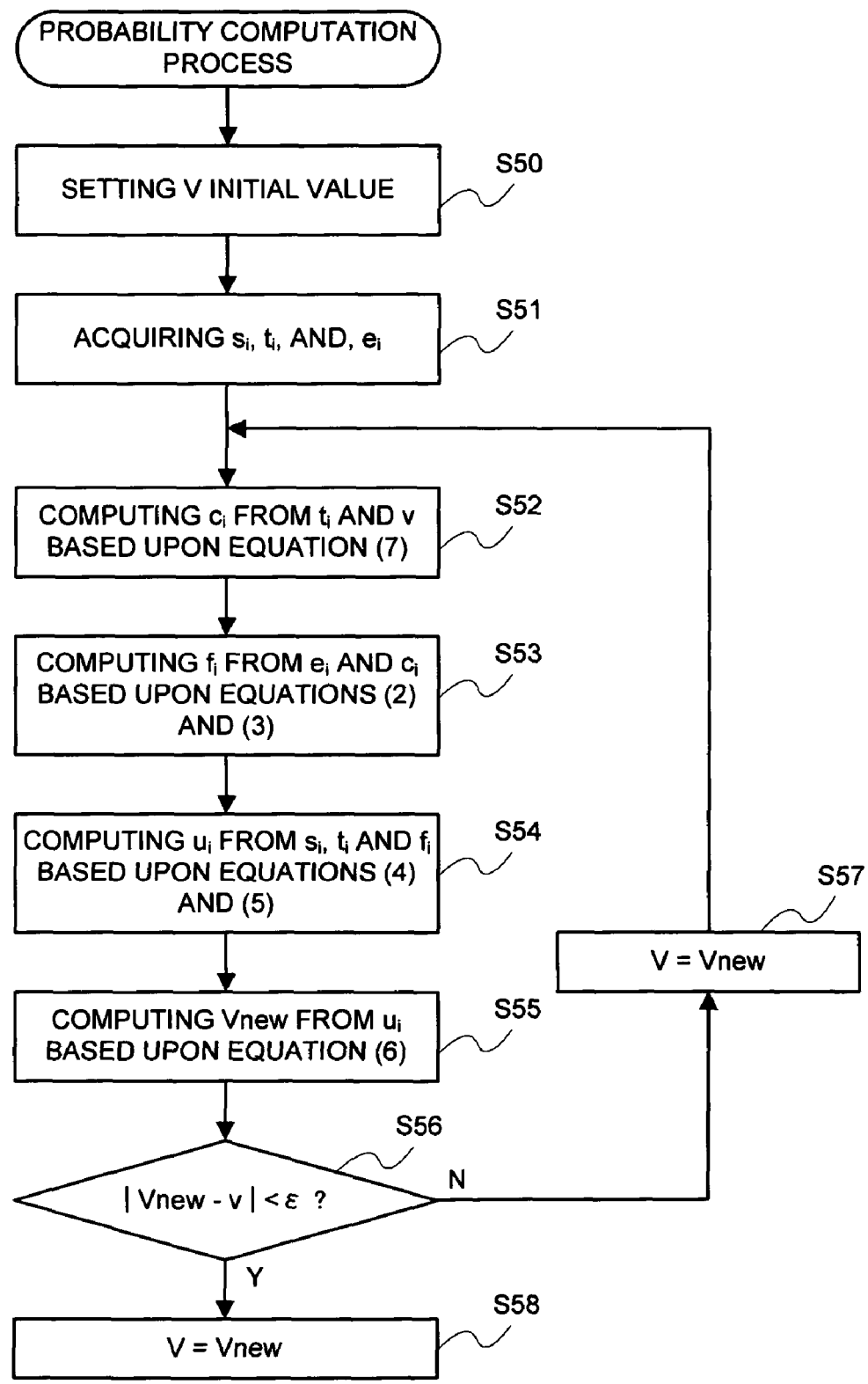
FIG. 6 is a flowchart illustrating one example of a probability computing process of obtaining each probability value by the probability computing section 22.

Herein, the operation that the probability computing section 22 obtains each probability value (collision probability, the retransmission probability, the channel bandwidth utilization ratio, and the channel vacant-bandwidth ratio) in the step S5 will be explained. FIG. 6 is a flowchart illustrating one example of the probability computation process that the probability computing section 22 obtains each probability value. Additionally, in this embodiment, the case that the probability computing section 22 obtains each probability value based upon the iterative assignment method will be explained as one example.

In the probability computation process, the probability computing section 22 sets the initial value of the channel vacant-bandwidth ratio v (step S50). The data storing section 226 of the probability computing section 22 pre-stores, for example, the initial value $v_0$ of the channel vacant-bandwidth ratio v input by the computation initial-value inputter 11 in having installed the wireless communication system. And, the probability computing section 22 sets the initial value $v_0$, which the data storing section 226 stores, to the initial value for obtaining each probability value by employing the iterative assignment method.

Further, the probability computing section 22 obtains the packet sending-out channel time $s_i$, the packet cycle time $t_i$, and the transmission error ratio $e_i$ according to a predetermined acquisition method (step S51). In this case, the probability computing section 22 inputs the packet sending-out channel time $s_i$ obtained by the packet sending-out time computing section 21. Further, the probability computing section 22 inputs, for example, the packet cycle time $t_i$ and the transmission error ratio $e_i$ extracted from the CODEC information from the SIP server by the inputting unit 10. Further, the probability computing section 22 inputs, for example, the packet cycle time $t_i$ and the transmission error ratio $e_i$ received by the inputting unit 10 from the access point 2. Further, the probability computing section 22 stores the acquired packet sending-out channel time $s_i$, packet cycle time $t_i$ and transmission error ratio $e_i$ in the data storing section 226 for the time being.

Additionally, the channel bandwidth utilization ratio evaluating server 1 may not acquire the packet sending-out channel time $s_i$, the packet cycle time $t_i$ and the transmission error ratio $e_i$ at the moment that the event such as occurrence of the new call has occurred, but may acquire theses kinds of information for each predetermined period. And, the probability computing section 22 may store the acquired packet sending-out channel time $s_i$, packet cycle time $t_i$ and transmission error ratio $e_i$ in the data storing section 226 to update them for each predetermined period. In this case, for example, in the step S51, at first, the probability computing section 22 draws a conclusion as to whether or not the packet sending-out channel time $s_i$, the packet cycle time $t_i$, and the transmission error ratio $e_i$ have already been stored in the data storing section 226. When the probability computing section 22 judges that they have already been stored, it extracts theses kinds of information from the data storing section 226. Further, when the probability computing section 22 judges that they have not been stored, it acquires the packet sending-out channel time $s_i$, the packet cycle time $t_i$, and the transmission error ratio $e_i$ according to a predetermined acquisition method.

The collision probability computing section 221 obtains the collision probability $c_i$ based upon the packet cycle time $t_i$ and the channel vacant-bandwidth ratio v by employing Equation (7) (step S52). Additionally, in this case, if the first-time computation is operated with the iterative assignment method, it follows that the collision probability computing section 221 obtains the collision probability $c_i$ by employing the initial value $v_0$ of the channel vacant-bandwidth ratio v.

Further, the retransmission probability computing section 222 obtains the retransmission probability $f_i$ based upon the transmission error ratio $e_i$, and the collision probability $c_i$ obtained in the step S52 by employing Equation (2) and Equation (3) (step S53). Further, the channel bandwidth utilization ratio computing section 223 obtains the channel bandwidth utilization ratio $u_i$ based upon the packet sending-out channel time $s_i$, and the packet cycle time $t_i$, and the retransmission probability $f_i$ obtained in the step S53 by employing Equation (4) and Equation (5) (step S54).

Further, the channel vacant-bandwidth ratio computing section 224 obtains the channel vacant-bandwidth ratio v based upon the channel bandwidth utilization ratio $u_i$ obtained in the step S54 by employing Equation (6) (step S55). Additionally, in this embodiment, the channel vacant-bandwidth ratio computing section 224 obtains the channel vacant-bandwidth ratio v repeatedly based upon the iterative assignment method until a predetermined convergence condition holds. In this embodiment, the value of the latest channel vacant-bandwidth ratio calculated by the channel vacant-bandwidth ratio computing section 224 is expressed as $v_{new}$.

The computation convergence determiner 225 determines whether or not a predetermined convergence condition has held, based upon the value $v_{new}$ of the latest channel vacant-bandwidth ratio obtained in the step S55 (step S56). In this case, the computation convergence determiner 225 draws a conclusion, for example, as to whether or not a difference between the value $v_{new}$ of the latest channel vacant-bandwidth ratio and the value v of the last channel vacant-bandwidth ratio but one obtained by the channel vacant-bandwidth ratio computing section 224 is smaller than a predetermined threshold $\epsilon$ (for example, "0.001"). When the computation convergence determiner 225 judges that a difference between the channel vacant-bandwidth ratios is smaller than a predetermined threshold, it determines that the predetermined convergence condition has held. Further, when the computation convergence determiner 225 judges that a difference between the channel vacant-bandwidth ratios is not smaller than a predetermined threshold, it determines that the predetermined convergence condition does not hold.

When it is determined that the predetermined convergence condition does not hold, the probability computing section 22 updates the value v of the channel vacant-bandwidth ratio into the latest value $v_{new}$ obtained in the step S55 (step S57). And, the probability computing section 22 returns to the step S52, and performs the processes of the step S52 to the step S57 repeatedly until the predetermined convergence condition holds.

When it is determined that the predetermined convergence condition has held, the probability computing section 22 updates the value v of the channel vacant-bandwidth ratio into the latest value $v_{new}$ obtained in the step S55 (step S58), and proceeds to the step S6.

When the probability computation process of the step S5 is finished, the outputting unit 30 outputs each probability value (the collision probability $c_i$, the retransmission probability $f_i$, the channel bandwidth utilization ratio $u_i$, and the channel vacant-bandwidth ratio v) obtained by the computing unit 20 according to a predetermined output method (step S6). For example, the outputting unit 30 outputs each probability value to the access point 2. Additionally, in the step S6, the outputting unit 30 may display, for example, a computation result computed in the step S5 in the display.

As mentioned above, in accordance with this embodiment, when the event such as occurrence of the new call occurs, the channel bandwidth utilization ratio evaluating server 1 obtains each probability value such as the channel bandwidth utilization ratio based upon various traffic parameters and transmission parameters. And, the channel bandwidth utilization ratio evaluating server 1 performs the process of evaluating (for example, determining propriety on receipt of the new call) the obtained channel bandwidth utilization ratio. For this, in the system for employing the wireless channel, which is accompanied by the random access, thereby to make stream communication, like the wireless LAN, when a change in the system condition has occurred, it becomes possible to grasp a change in the channel use situation and an influence upon the communication quality due to its change in a moment (on a real-time basis). Further, it is possible to effectively execute the call receipt control etc. and to carry out the effective system control and administration. Thus, in the system for making stream communication that is accompanied by the random access, an influence of a change in the system condition upon the channel bandwidth utilization ratio can be evaluated precisely.

Embodiment 2

Figure 7:
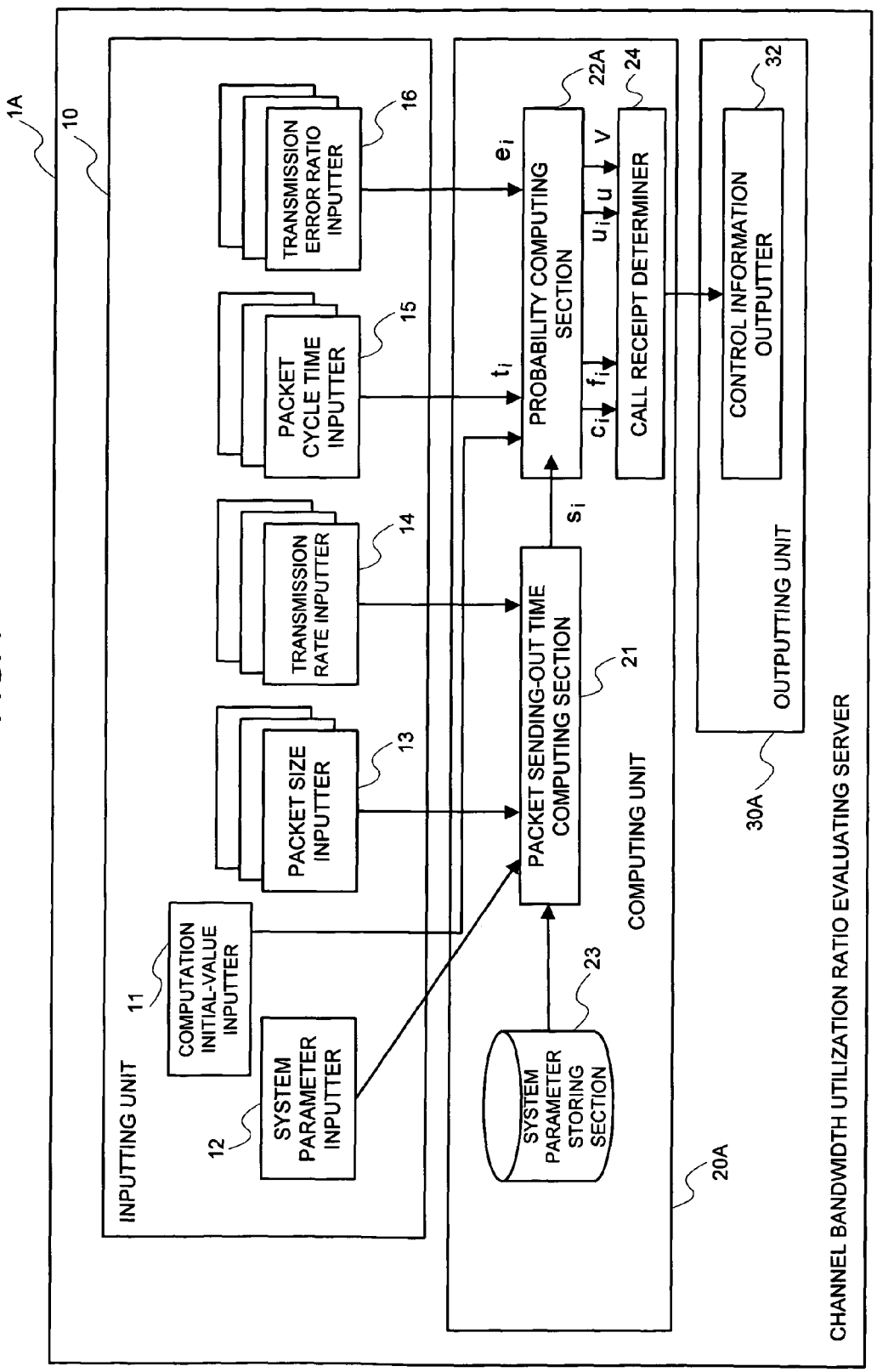
FIG. 7 is a block diagram illustrating another configuration example of the channel bandwidth utilization ratio evaluating server.

Next, a second embodiment of the present invention will be explained by making a reference to the accompanied drawings. FIG. 7 is a block diagram illustrating another configuration example of the channel bandwidth utilization ratio evaluating server. In this embodiment, a specific example, in which after obtaining the channel bandwidth utilization ratio, a channel bandwidth utilization ratio evaluating server 1A evaluates the obtained channel bandwidth utilization ratio, will be explained. In this embodiment, the channel bandwidth utilization ratio evaluating server 1A determines propriety on receipt of the new call based upon the obtained channel bandwidth utilization ratio.

As shown in FIG. 7, this embodiment differs from the first embodiment in that a computing unit 20A of the channel bandwidth utilization ratio evaluating server 1A includes a call receipt determiner 24 in addition to the configuration elements of the computing unit 20 shown in FIG. 3. Further, a function of a probability computing section 22A of the computing unit 20A in this embodiment differs from that of the probability computing section 22 shown in the first embodiment. Further, as shown in FIG. 7, this embodiment differs from the first embodiment in that an outputting unit 30A includes a control information outputter 32 instead of the result outputter 31 shown in FIG. 3.

Additionally, in this embodiment, functions of the access point 2 and the wireless terminal 3 are similar to these functions shown in the first embodiment. Further a function of the inputting unit 10 is similar to that of the inputting unit 10 shown in the first embodiment. Further, functions of the packet sending-out time computing section 21 and the system parameter storing section 23 of the computing unit 20A are similar to these functions shown in the first embodiment.

The probability computing section 22A has a function of obtaining the channel bandwidth utilization ratio u indicating a rate at which both of the up-stream and the down-stream utilize the channel bandwidth of the VoWLAN in addition to the function of the probability computing section 22 shown in the first embodiment. For example, the probability computing section 22A obtains the upward-direction channel bandwidth utilization ratio $u_i$ according to the similar process to that of the probability computing section 22 shown in the first embodiment. Further, the probability computing section 22A obtains the downward-direction channel bandwidth utilization ratio ($u_i$ with an underbar symbol) according to the similar process to that of the probability computing section 22 shown in the first embodiment. And, the probability computing section 22A obtains the channel bandwidth utilization ratio u having both streams taken into consideration based upon the upward-direction and the downward-direction channel bandwidth utilization ratios by employing Equation (8).

[Numeral equation 8]

$$u = \sum (u_i + \underline{u}_i) \qquad \text{Equation (8)}$$

Additionally, the function of the probability computing section 22A other than the function of obtaining the channel bandwidth utilization ratio u having both of the up-stream and the down-stream taken into consideration is similar to that of the probability computing section 22 shown in the first embodiment.

The call receipt determiner 24 is specifically realized by means of the CPU of the information processing unit that operates according to the program. The call receipt determiner 24 has a function of, in a case where any of the access points 2 has detected occurrence of the new call, determining whether or not receipt of the new call is permitted based upon the channel bandwidth utilization ratio obtained by the probability computing section 22A. In this embodiment, the call receipt determiner 24 draws a conclusion as to whether the channel bandwidth utilization ratio u having both of the up-stream and the down-stream taken into consideration is smaller than a predetermined threshold, thereby to determine whether or not receipt of the new call is permitted.

The control information outputter 32 is specifically realized by means of the CPU of the information processing unit that operates according to the program, and the network interfacer. The control information outputter 32 has a function of, based upon the determination result of the call receipt determiner 24, controlling the receipt process of the call that the access point 2 performs. In this embodiment, when the call receipt determiner 24 determines that the receipt of the new call is permitted, the control information outputter 32 outputs call receipt permission notification information saying the effect that the receipt of the new call is permitted to the access point 2. Further, when the call receipt determiner 24 determines that the receipt of the new call is rejected, the control information outputter 32 outputs call receipt rejection notification information saying the effect that the receipt of the new call is rejected to the access point 2.

Figure 8:
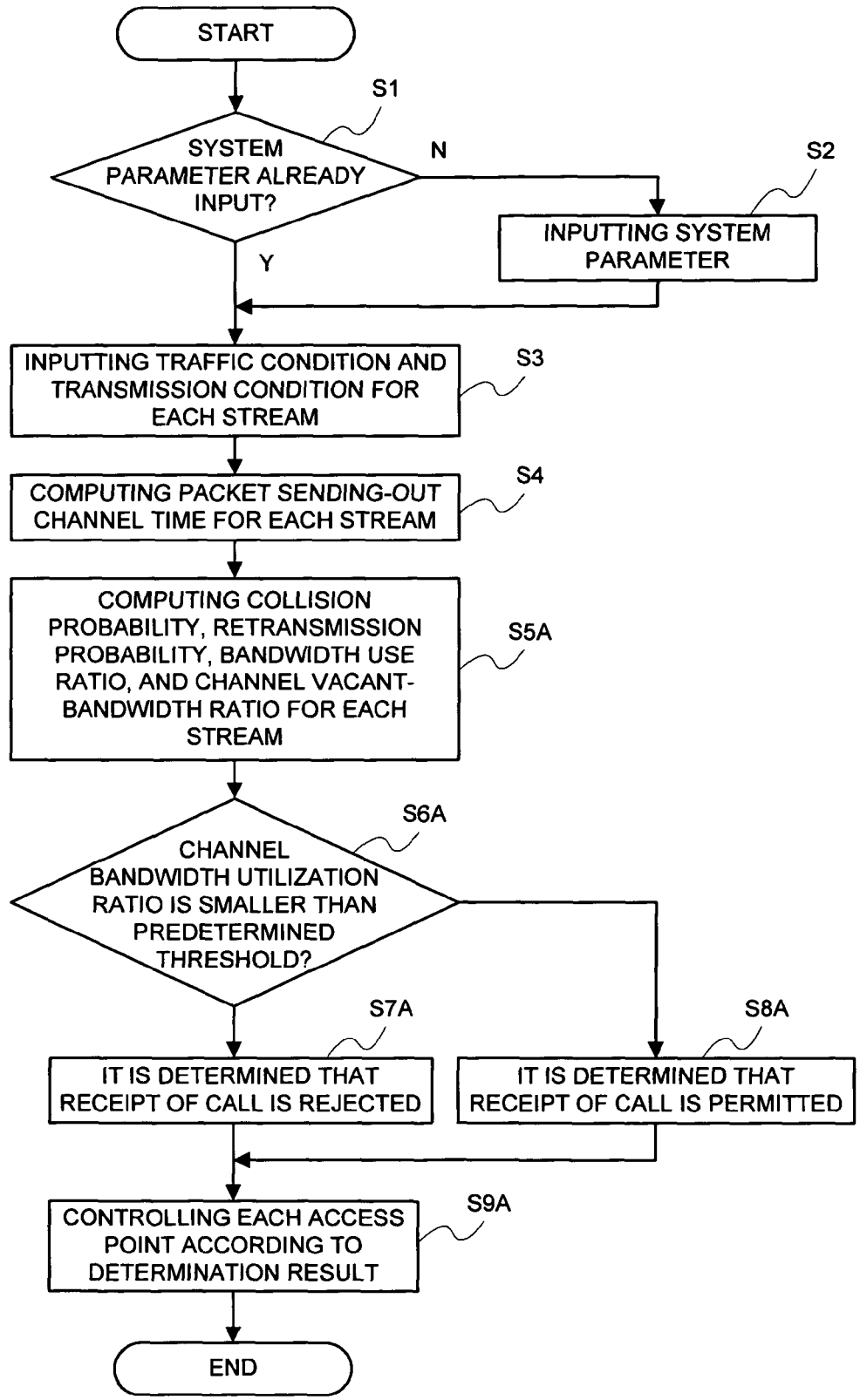
FIG. 8 is a flowchart illustrating another example of the channel bandwidth utilization ratio evaluation process of obtaining and evaluating the channel bandwidth utilization ratio.

Next, an operation will be explained. FIG. 8 is a flowchart illustrating another example of the channel bandwidth utilization ratio evaluation process of obtaining/evaluating the channel bandwidth utilization ratio. In this embodiment, the case that any of the access points 2 detects occurrence of the new call as the new event in the wireless communication system will be explained. When the access point 2 detects occurrence of the new call, it transmits a request for determining whether or not the receipt of the new call should be permitted to the channel bandwidth utilization ratio evaluating server 1A.

Upon receiving the determination request of propriety on the receipt of the new call, the channel bandwidth utilization ratio evaluating server 1A starts to perform the channel bandwidth utilization ratio evaluation process shown in FIG. 8. Additionally, in FIG. 8, the processes of the step S1 to the step S4 are similar to these processes shown in the first embodiment.

Upon calculating the packet sending-out channel time $s_t$ in the step S4, the probability computing section 22A calculates each probability value according to the process similar to that of step S5 shown in the first embodiment (step S5A). Further, in the step S5A, the probability computing section 22A obtains the channel bandwidth utilization ratio u having both of the up-stream and the down-stream taken into consideration based upon the upward-direction and the downward-direction channel bandwidth utilization ratios by employing Equation (8).

The call receipt determiner 24 draws a conclusion as to whether or not the channel bandwidth utilization ratio u obtained in the step S5A is smaller than a predetermined threshold (for example, "0.85", and "0.9") (whether or nor channel bandwidth utilization ratio u<predetermined threshold) (step S6A). When it is judged that the channel bandwidth utilization ratio u is not smaller than a predetermined threshold, the call receipt determiner 24 determines that the receipt of the new call is rejected (step S7A). Further, when it is judged that the channel bandwidth utilization ratio u is smaller than a predetermined threshold, the call receipt determiner 24 determines that the receipt of the new call is permitted (step S8A).

The control information outputter 32 of the outputting unit 30 controls the access point 2 having received a request for determining propriety on the receipt of the new call, according to the determination result of the call receipt determiner 24 (step S9A). In this case, when the call receipt determiner 24 has determined that the receipt of the new call is rejected, the control information outputter 32 transmits the call receipt rejection notification information to the access point 2 having received the determination request. Further, when the call receipt determiner 24 has determined that the receipt of the new call is permitted, the control information outputter 32 transmits the call receipt permission notification information to the access point 2 having received the determination request.

The access point 2 determines whether or not the call receipt permission notification information has been received from the channel bandwidth utilization ratio evaluating server 1A. When it is determined that not the call receipt permission notification information but the call receipt rejection notification information has been received, the access point 2 rejects the receipt of the new call according to the received call receipt rejection notification information, and does not make a connection to the wireless terminal 3, being the incoming destination. Further, When it is determined that the call receipt permission notification information has been received, the access point 2 permits the receipt of the new call according to the received call receipt permission notification information, and makes a connection to the wireless terminal 3, being the incoming destination.

As mentioned above, in accordance with this embodiment, the channel bandwidth utilization ratio evaluating server 1A determines whether or not the receipt of the new call is permitted, based upon the channel bandwidth utilization ratio u. And, the channel bandwidth utilization ratio evaluating server 1A transmits the notification information indicating whether or not the receipt of the new call is permitted to the access point 2, and controls the access point 2. Thus, in the system for making stream communication, which is accompanied by the random access, making a determination of the call receipt control on the basis of the evaluation result of the channel bandwidth utilization ratio enables the wireless resource to be control and administered.

Embodiment 3

Figure 9:
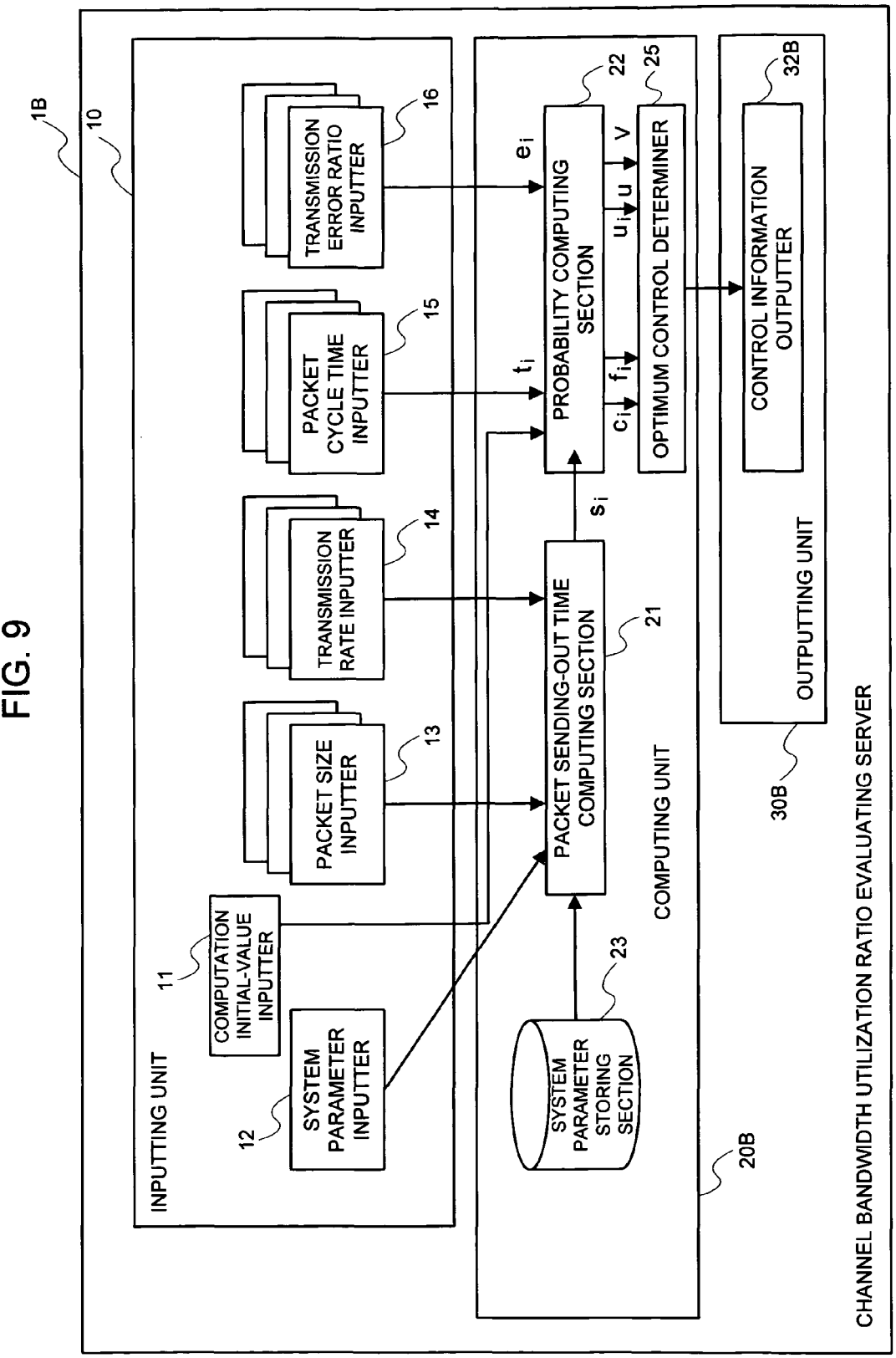
FIG. 9 is a block diagram illustrating yet another configuration example of the channel bandwidth utilization ratio evaluating server.

Next, a third embodiment of the present invention will be explained by making a reference to the accompanied drawings. FIG. 9 is a block diagram illustrating yet another configuration example of the channel bandwidth utilization ratio evaluating server. In this embodiment, a specific example in which, after obtaining the channel bandwidth utilization ratio, a channel bandwidth utilization ratio evaluating server 1B evaluates the obtained channel bandwidth utilization ratio will be explained. In this embodiment, the channel bandwidth utilization ratio evaluating server 1B determines an optimum control that each access point 2 should execute, based upon the obtained channel bandwidth utilization ratio.

As shown in FIG. 9, this embodiment differs from the first embodiment in that a computing unit 20B of the channel bandwidth utilization ratio evaluating server 1B includes an optimum control determiner 25 in addition to the configuration elements of the computing unit 20 shown in FIG. 3. Further, a function of a probability computing section 22B of the computing unit 20B in this embodiment differs from that of the probability computing section 22 shown in the first embodiment. Further, as shown in FIG. 9, this embodiment differs from the first embodiment in that an outputting unit 30B includes a control information outputter 32B instead of the result outputter 31 shown in FIG. 3.

Additionally, in this embodiment, functions of the access point 2 and the wireless terminal 3 are similar to these functions shown in the first embodiment. Further, a function of the inputting unit 10 is similar to that of the inputting unit 10 shown in the first embodiment. Further, functions of a packet sending-out time computing section 21 and a system parameter storing section 23 of the computing unit 20B are similar to these functions shown in the first embodiment.

The probability computing section 22B has a function of obtaining the channel bandwidth utilization ratio u having both of the up-stream and the down-stream taken into consideration in addition to the function of the probability computing section 22 shown in the first embodiment. In this embodiment, the probability computing section 22B obtains the channel bandwidth utilization ratio u according to the similar process to that of the probability computing section 22A shown in the second embodiment.

Further, in this embodiment, for example, in a case of having received a request for determining an optimum transmission rate from the access point 2, the probability computing section 22B employs a plurality of the transmission rates, thereby to obtain respective channel bandwidth utilization ratios u. In this case, for example, the probability computing section 22B employs each transmission rate specified in the IEEE 802.11, thereby to obtain the channel bandwidth utilization ratio u, respectively.

Further, for example, in the case of having received a request for determining an optimum handover destination from the access point 2, the probability computing section 22B obtains the channel bandwidth utilization ratio u, respectively, in having caused the wireless terminal 3 to make handover to each access point 2, which is included in the wireless communication system. In this case, for example, the inputting unit 10 receives the packet size, the transmission rate, the packet cycle time and the transmission error ratio from each access point 2, respectively. And, the probability computing section 22B obtains the channel bandwidth utilization ratio u for each access point 2 based upon the packet size, the transmission rate, the packet cycle time and the transmission error ratio input from the inputting unit 10.

The optimum control determiner 25 is specifically realized by means of the CPU of the information processing unit that operates according to the program. The optimum control determiner 25 has a function of, in a case where the event has occurred in any of the access points 2, determining the optimum control that the access point 2 should execute.

The control information outputter 32B has a function of, based upon the determination result of the optimum control determiner 25, causing the access point 2 to execute the optimum control. In this embodiment, the control information outputter 32B outputs notification information including the content of the optimum control determined by the optimum control determiner 25 to the access point 2.

Figure 10:
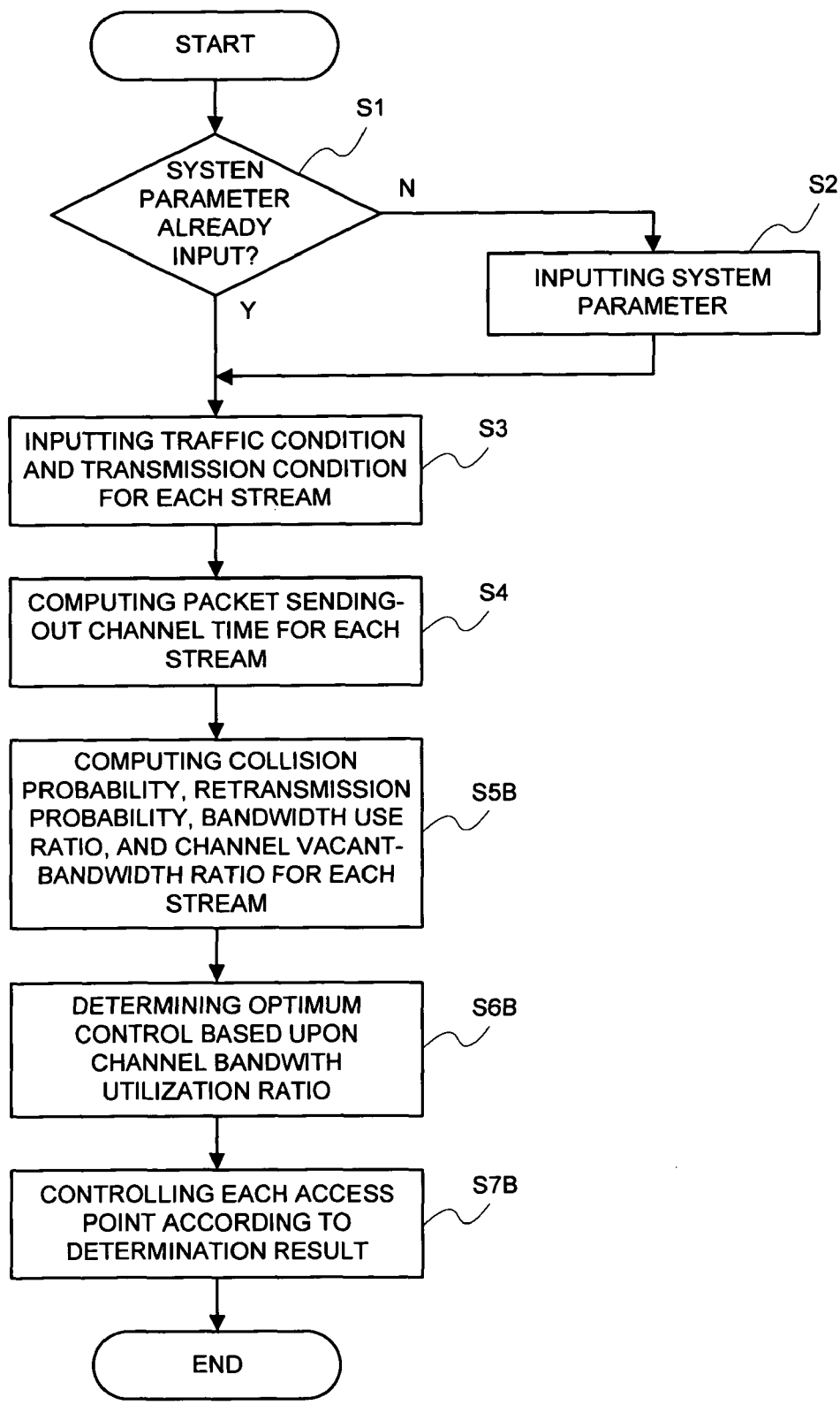
FIG. 10 is a flowchart illustrating yet another example of the channel bandwidth utilization ratio evaluation process of obtaining and evaluating the channel bandwidth utilization ratio.

Next, an operation will be explained. FIG. 10 is a flowchart illustrating yet another example of the channel bandwidth utilization ratio evaluation process of obtaining/evaluating the channel bandwidth utilization ratio. In this embodiment, the case that, in the wireless communication system, any of the access points 2 detects a deterioration in the communication state between the access point 2 and the wireless terminal 3 as the new event will be explained. In this embodiment, when the access point 2 detects a decline in the signal level of the received signal from the terminal 3 and an increase in the communication error ratio, it judges that the state of communication with the wireless terminal 3 has deteriorated.

Upon detecting a decline in the signal level and an increase in the communication error ratio, the access point 2 transmits a request for determining an optimum control that should be executed to the channel bandwidth utilization ratio evaluating server 1B. For example, the access point 2 transmits a request for determining an optimum transmission rate that should be changed to the channel bandwidth utilization ratio evaluating server 1B. Further, for example, the access point 2 transmits a request for determining an optimum handover destination of the wireless terminal 3 to the channel bandwidth utilization ratio evaluating server 1B.

Upon receiving a request for determining an optimum control, the channel bandwidth utilization ratio evaluating server 1B starts to perform the channel bandwidth utilization ratio evaluation process as shown in FIG. 10. Additionally, in FIG. 10, the processes of the step S1 to the step S4 are similar to these processes shown in the first embodiment.

Upon calculating the packet sending-out channel time $s_t$ in the step S4, the probability computing section 22B computes each probability value according to the process similar to that of the step S5 shown in the first embodiment (step S5B). Further, the probability computing section 22B obtains the channel bandwidth utilization ratio u having both of the up-stream and the down-stream taken into consideration according to the process similar to that of the step S5A shown in the second embodiment.

Further, for example, in the case of having received a request for determining an optimum transmission rate from the access point 2, the probability computing section 22B employs a plurality of the transmission rates, thereby to obtain respective channel bandwidth utilization ratios u in the step S5B. In this case, the probability computing section 22B obtains the channel bandwidth utilization ratio u for each transmission rate, thereby to obtain a plurality of the channel bandwidth utilization ratios u. Further, for example, in the case of having received a request for determining an optimum handover destination from the access point 2, in the step S5B, the probability computing section 22B obtains the channel bandwidth utilization ratio u, respectively, in having caused the wireless terminal 3 to make handover to each access point 2. In this case, the probability computing section 22B obtains respective channel bandwidth utilization ratios u based upon the traffic parameter and the transmission parameter for each access point 2.

Upon calculating each probability value in the step S5A, the optimum control determiner 25 determines the optimum control that the access point 2 should execute based upon the channel bandwidth utilization ratios u obtained in the step S5B (step S6B).

For example, in the case of having received a request for determining an optimum transmission rate, the optimum control determiner 25 selects the utilization ratio that becomes minimized, from among a plurality of the channel bandwidth utilization ratios u obtained in the step S5B. Further, the optimum control determiner 25 specifies the transmission rate (the transmission rate employed for calculating the channel bandwidth utilization ratio u) corresponding to the selected channel bandwidth utilization ratio u.

Further, for example, in the case of having received a request for determining an optimum handover destination, the optimum control determiner 25 selects the utilization ratio that becomes minimized, from among a plurality of the channel bandwidth utilization ratios u obtained in the step S5B. Further, the optimum control determiner 25 specifies the access point 2 corresponding to the selected channel bandwidth utilization ratio u as the optimum handover destination. That is, the optimum control determiner 25 draws a conclusion as to which access point 2, to which the wireless terminal 3 is caused to make handover, allows the channel bandwidth utilization ratio u to be minimized.

The control information outputter 32B of the outputting unit 30 controls each access point 2 according to the determination result of the optimum control determiner 25 (step S7B). For example, in the case of having received a request for determining an optimum transmission rate, the control information outputter 32B transmits notification information including the transmission rate specified in the step S6B to the access point 2 having received the determination request. Hereupon, the access point 2 changes the transmission rate that is employed for communication with the wireless terminal 3, according to the transmission rate to be included in the received notification information.

Further, for example, in the case of having received a request for determining an optimum handover destination, the control information outputter 32B transmits notification information including the handover destination specified in the step S6B to the access point 2 having received the determination request. Hereupon, the access point 2 instructs the wireless terminal 3 to make handover, according to the handover destination that is included in the received notification information. That is, the access point 2 causes the wireless terminal 3 to make a switchover of the access point 2, being a connection destination, to the handover destination that is included in the communication information.

As mentioned above, in accordance with this embodiment, the channel bandwidth utilization ratio evaluating server 1B determines various optimum controls based upon the channel bandwidth utilization ratio u. And, the channel bandwidth utilization ratio evaluating server 1B transmits the notification information including the content of the determined optimum control to the access point 2, and controls the access point 2. Thus, in the system for making stream communication, which is accompanied by the random access, making a determination of the optimum control on the basis of the evaluation result of the channel bandwidth utilization ratio enables the wireless resource to be controlled and administered.

The present invention is applicable to system for making various kinds of the stream communication, which is accompanied by the random access. For example, it is applicable to the application of providing the voice communication service such as the IP telephone service by utilizing the wireless LAN such as the VoWLAN for making voice stream communication.

What is claimed is:

1. A channel bandwidth utilization ratio evaluation method of evaluating a utilization ratio of a channel bandwidth of a wireless communication system for making stream communication, said wireless communication system accompanied by random access, the method comprising:
   receiving, by a channel bandwidth utilization ratio evaluating apparatus, a determination request for allocation of bandwidth;
   obtaining a traffic parameter, being a parameter indicating a traffic condition in said wireless communication system, and a transmission parameter, being a parameter indicating a transmission condition in which data is transmitted in said wireless communication system;
   evaluating a transmission collision probability based on coder-decoder (CODEC) information and packet cycle time information of each stream;
   calculating a channel bandwidth utilization ratio, being a utilization ratio at which data utilizes a bandwidth of a channel of said wireless communication system, based on the obtained traffic parameter and obtained transmission parameter; and
   determining whether to permit the allocation of bandwidth based on the calculated channel bandwidth utilization ratio,
   wherein said wireless communication system employs a Medium Access Control (MAC) layer to thereby make stream-type communication in a wireless environment accompanied by data retransmission due to a wireless transmission error or a collision of data.

2. A wireless communication system for making stream communication, said wireless communication system accompanied by random access, comprising:
   an access point which transmits a determination request for allocation of bandwidth; and a channel bandwidth utilization ratio evaluating apparatus for evaluating a utilization ratio of a channel bandwidth of said wireless communication system, wherein said channel bandwidth utilization ratio evaluating apparatus includes:
   evaluating means which evaluates a transmission collision probability based on coder-decoder (CODEC) information and packet cycle time information of each stream, and
   a utilization ratio calculating means which receives the determination request from the access point,
   wherein upon receiving the request, said utilization ratio calculating means obtains a traffic parameter, being a parameter indicating a traffic condition in said wireless communication system, and a transmission parameter, being a parameter indicating a transmission condition in which data is transmitted, and
   wherein said utilization ratio calculating means calculates a channel bandwidth utilization ratio, being a utilization ratio at which data utilizes the bandwidth of the channel of said wireless communication system, based on the obtained traffic parameter and obtained transmission parameter; and
   a utilization ratio evaluating means which determines whether to permit the allocation of bandwidth based on the calculated channel bandwidth utilization ratio,
   wherein said wireless communication system employs a Medium Access Control (MAC) layer to thereby make stream-type communication in a wireless environment accompanied by data retransmission due to a wireless transmission error or a collision of data.

3. The wireless communication system according to claim 2, wherein the access point includes a determination request transmitting means for, upon detecting occurrence of a new event, transmitting a request for determining a control that should be executed for the new event to the channel bandwidth utilization ratio evaluating apparatus.

4. The wireless communication system according to claim 3, wherein the channel bandwidth utilization ratio evaluating apparatus includes a parameter acquiring means for, upon receiving the determination request from the access point, acquiring a current traffic parameter and transmission parameter in the wireless communication system, and
   wherein the utilization ratio calculating means obtains the channel bandwidth utilization ratio based upon the current traffic parameter and transmission parameter obtained by said parameter acquiring means.

5. The wireless communication system according to claim 4, wherein the parameter acquiring means, upon receiving the determination request from the access point, receives CODEC information from an SIP server and extracts the current traffic parameter and transmission parameter from said received CODEC information.

6. The wireless communication system according to claim 4, wherein the determination request transmitting means transmits to the channel bandwidth utilization ratio evaluating apparatus the current traffic parameter and transmission parameter that the access point is employing for communication with a user terminal, together with a request for determining a control that should be executed for the new event, and
   wherein the parameter acquiring means receives the current traffic parameter and transmission parameter from said access point in receiving the determination request from the access point.

7. The wireless communication system according to one of claim 3 to claim 6, wherein the channel bandwidth utilization ratio evaluating apparatus includes a determination result transmitting means for transmitting a determination result by the control determining means to the access point, and
   wherein the access point includes a control executing means for executing a predetermined control for the new event according to the determination result received from said channel bandwidth utilization ratio evaluating apparatus.

8. The wireless communication system according to claim 2, wherein the access point includes a call receipt determination request transmitting means for, upon detecting occurrence of the new call, transmitting a request for determining propriety on receipt of the new call to the channel bandwidth utilization ratio evaluating apparatus,
wherein the utilization ratio calculating means, upon receiving the determination request from said access point, obtaining a channel bandwidth utilization ratio based upon the traffic parameter and the transmission parameter, and
wherein the utilization ratio evaluating means includes a call receipt determining means for determining whether or not receipt of the new call is permitted, based upon the channel bandwidth utilization ratio obtained by said utilization ratio calculating means.

9. The wireless communication system according to claim 8, wherein the utilization ratio evaluating means includes a threshold determining means for determining whether or not the channel bandwidth utilization ratio obtained by the utilization ratio calculating means is smaller than a predetermined threshold, and
wherein the call receipt determining means determines that receipt of the new call is permitted when said threshold determining means determines that the channel bandwidth utilization ratio is smaller than a predetermined threshold.

10. The wireless communication system according to one of claim 8 and claim 9, wherein the channel bandwidth utilization ratio evaluating apparatus includes a permission information transmitting means for, when the call receipt determining means determines that receipt of the new call is permitted, transmitting call receipt permission information saying the effect that receipt of the new call is permitted to the access point, and
wherein the access point includes:
a permission information reception determining means for determining whether or not said call receipt permission information has been received from said channel bandwidth utilization ratio evaluating apparatus; and
a call receipt controlling means for permitting receipt of the new call when said permission information reception determining means determines that said call receipt permission information has been received.

11. The wireless communication system according to claim 2, wherein the access point includes a rate determination request transmitting means for, upon detecting a deterioration in a communication state between the access point and a user terminal, transmitting a request for determining an optimum transmission rate to the channel bandwidth utilization ratio evaluating apparatus,
wherein the utilization ratio calculating means calculates the channel bandwidth utilization ratio for each transmission rate, thereby to obtain a plurality of the channel bandwidth utilization ratios, and
wherein the utilization ratio evaluating means includes:
a minimum value selecting means for selecting the channel bandwidth utilization ratio that becomes minimized, from among a plurality of the channel bandwidth utilization ratios obtained by said utilization ratio calculating means; and
an optimum rate specifying means for specifying the transmission rate corresponding to the channel bandwidth utilization ratio selected by said minimum value selecting means as an optimum transmission rate.

12. The wireless communication system according to claim 11, wherein the channel bandwidth utilization ratio evaluating apparatus includes a notification information transmitting means for transmitting notification information including the transmission rate specified by the optimum rate specifying means to the access point, and
wherein the access point includes a rate changing means for changing the transmission rate that is employed for communication between the access point and the user terminal, according to the transmission rate that is included in the notification information received from said channel bandwidth utilization ratio evaluating apparatus.

13. The wireless communication system according to claim 2, wherein the access point includes a handover destination determination request transmitting means for, upon detecting a deterioration in a communication state between the access point and the user terminal, transmitting a request for determining an optimum handover destination of said user terminal to the channel bandwidth utilization ratio evaluating apparatus,
wherein the utilization ratio calculating means obtains respective channel bandwidth utilization ratios based upon the traffic parameter and the transmission parameter for each access point that is included in the wireless communication system, and
wherein the utilization ratio evaluating means includes:
a minimum value selecting means for selecting the channel bandwidth utilization ratio that becomes minimized, from among a plurality of the channel bandwidth utilization ratios obtained by said utilization ratio calculating means; and
a handover destination specifying means for specifying the access point corresponding to the channel bandwidth utilization ratio selected by said minimum value selecting means as an optimum handover destination.

14. The wireless communication system according to claim 13, wherein the channel bandwidth utilization ratio evaluating apparatus includes a notification information transmitting means for transmitting notification information including the handover destination specified by the handover destination specifying means to the access point, and
wherein the access point includes a handover instructing means for instructing the user terminal, which is making communication with the access point, to make handover according to the handover destination that is included in the notification information received from said channel bandwidth utilization ratio evaluating apparatus.

15. A channel bandwidth utilization ratio evaluating apparatus for evaluating a utilization ratio of a channel bandwidth of a wireless communication system for making stream communication, said wireless communication system accompanied by random access, the apparatus comprising:
evaluating means which evaluates a transmission collision probability based on coder-decoder (CODEC) information and packet cycle time information of each stream, and
a utilization ratio calculating means which receives a determination request for allocation of bandwidth,
wherein upon receiving the request, said utilization ratio calculating means obtains a traffic parameter, being a parameter indicating a traffic condition in said wireless communication system, and a transmission parameter, being a parameter indicating a transmission condition in which data is transmitted, and wherein said utilization ratio calculating means calculates a channel bandwidth utilization ratio, being a utilization ratio at which data utilizes the bandwidth of the channel of said wireless communication system, based on the obtained traffic parameter and obtained transmission parameter; and a utilization ratio evaluating means which determines whether to permit the allocation of bandwidth based on the calculated channel bandwidth utilization ratio, wherein said wireless communication system employs a Medium Access Control (MAC) layer to thereby make stream-type communication in a wireless environment accompanied by data retransmission due to a wireless transmission error or a collision of data.

16. A non-transitory recording medium having a channel bandwidth utilization ratio evaluation program for evaluating a utilization ratio of a channel bandwidth of a wireless communication system, said wireless communication system accompanied by random access, wherein said channel bandwidth utilization ratio evaluation program causes a computer to perform:

an evaluating process which evaluates a transmission collision probability based on coder-decoder (CODEC) information and packet cycle time information of each stream, and a utilization ratio calculating process which receives a determination request for allocation of bandwidth, wherein upon receiving the request, said utilization ratio calculating process obtains a traffic parameter, being a parameter indicating a traffic condition in said wireless communication system, and a transmission parameter, being a parameter indicating a transmission condition in which data is transmitted, and wherein said utilization ratio calculating process calculates a channel bandwidth utilization ratio, being a utilization ratio at which data utilizes the bandwidth of the channel of said wireless communication system, based on the obtained traffic parameter and obtained transmission parameter; and a utilization ratio evaluation process which determines whether to permit the allocation of bandwidth based on the calculated obtained channel bandwidth utilization ratio, wherein said wireless communication system employs a Medium Access Control (MAC) layer to thereby make stream-type communication in a wireless environment accompanied by data retransmission due to a wireless transmission error or a collision of data.

17. The recording medium having a channel bandwidth utilization ratio evaluation program filed according to claim 16, wherein said channel bandwidth utilization ratio evaluation program causes a computer:

to perform a call receipt determination request reception process of, at the moment that occurrence of a new call has been detected, receiving a request for determining propriety on receipt of the new call from the access point;

to perform a process of, upon receiving the determination request from said access point, obtaining a channel bandwidth utilization ratio based upon the traffic parameter and the transmission parameter, said process being a utilization ratio calculation process; and to perform a call receipt determination process of determining whether or not receipt of said new call is permitted based upon said obtained channel bandwidth utilization ratio, said call receipt determination process being a utilization ratio evaluation process.

18. The recording medium having a channel bandwidth utilization ratio evaluation program filed according to claim 17, wherein said channel bandwidth utilization ratio evaluation program causes a computer:

to perform a threshold determination process of determining whether or not the obtained channel bandwidth utilization ratio is smaller than a predetermined threshold, said threshold determination process being a utilization ratio evaluation process; and to perform a process of determining that receipt of the new call is permitted when it is determined in said threshold determination process that the channel bandwidth utilization ratio is smaller than a predetermined threshold, said process being a call receipt determination process.

19. The recording medium having a channel bandwidth utilization ratio evaluation program filed according to claim 16, wherein said channel bandwidth utilization ratio evaluation program causes a computer:

to perform a rate determination request reception process of, at the moment that a deterioration in a communication state between an access point and a user terminal has been detected, receiving a request for determining an optimum transmission rate from the access point;

to perform a process of calculating the channel bandwidth utilization ratio for each transmission rate, thereby to obtain a plurality of channel bandwidth utilization ratios, said process being a utilization ratio calculation process; and to perform a minimum value selection process of selecting the channel bandwidth utilization ratio that becomes minimized, from among a plurality of the channel bandwidth utilization ratios obtained in said utilization ratio calculation process, said minimum value selection process being a utilization ratio evaluation process, and an optimum rate specification process of specifying the transmission rate corresponding to the channel bandwidth utilization ratio selected in said minimum value selection process as an optimum transmission rate, said optimum rate specification process being a utilization ratio evaluation process.

20. The recording medium having a channel bandwidth utilization ratio evaluation program filed according to claim 16, wherein said channel bandwidth utilization ratio evaluation program causes a computer:

to perform a handover destination determination request reception process of, at the moment that a deterioration in a communication state between an access point and a user terminal has been detected, receiving a request for determining an optimum handover destination of said user terminal from the access point;

to perform a process of, based upon the traffic parameter and the transmission parameter for each access point that is included in the wireless communication system, obtaining respective channel bandwidth utilization ratios, said process being a utilization ratio calculation process; and to perform a minimum value selection process of selecting the channel bandwidth utilization ratio that becomes minimized, from among a plurality of the channel bandwidth utilization ratios obtained in said utilization ratio calculation process, said minimum value selection process being a utilization ratio evaluation process, and a handover destination specification process of specifying the access point corresponding to the channel bandwidth utilization ratio selected in said minimum value selection process as an optimum handover destination, said handover destination specification process being a utilization ratio evaluation process.

* * * * *

UNITED STATES PATENT AND TRADEMARK OFFICE
CERTIFICATE OF CORRECTION

PATENT NO. : 8,238,293 B2
APPLICATION NO. : 11/514906
DATED : August 7, 2012
INVENTOR(S) : Huanxu Pan It is certified that error appears in the above-identified patent and that said Letters Patent is hereby corrected as shown below:

In the Specification

Column 19, Line 58: Delete " $f_i = 1-(1-e_i)(1-c_o), i=1, \ldots, n$ " and insert -- $\underline{f_i} = 1-(1-\underline{e_i})(1-c_o), i=1, \cdots, n$ --, therefor.

Signed and Sealed this
First Day of October, 2013

Teresa Stanek Rea
*Deputy Director of the United States Patent and Trademark Office*